(12) United States Patent
Yu et al.

(10) Patent No.: US 11,907,547 B2
(45) Date of Patent: Feb. 20, 2024

(54) POWER MANAGEMENT

(71) Applicant: MICRON TECHNOLOGY, INC., Boise, ID (US)

(72) Inventors: Liang Yu, Boise, ID (US); Jonathan S. Parry, Boise, ID (US); Xiaojiang Guo, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/729,207

(22) Filed: Apr. 26, 2022

(65) Prior Publication Data
US 2022/0350504 A1 Nov. 3, 2022

Related U.S. Application Data

(60) Provisional application No. 63/182,015, filed on Apr. 30, 2021.

(51) Int. Cl.
*G06F 12/00* (2006.01)
*G06F 3/06* (2006.01)
(Continued)

(52) U.S. Cl.
CPC .......... *G06F 3/0625* (2013.01); *G06F 1/3206* (2013.01); *G06F 1/3215* (2013.01);
(Continued)

(58) Field of Classification Search
CPC .. G06F 1/3206; G06F 1/3215; G06F 2119/06; G06F 3/0625; G06F 3/0631; G11C 16/0483
See application file for complete search history.

(56) References Cited

U.S. PATENT DOCUMENTS 9,147,685 B2 9/2015 Byun et al.
9,293,176 B2 3/2016 Grunzke
(Continued)

OTHER PUBLICATIONS

Siau et al. "A 512Gb 3-bit/Cell 3D Flash Memory on 128-Wordline-Layer with 132MB/S Write Performance Featuring Circuit-Under-Array Technology," 2019 ISSCC, Session 13, Non-Volatile Memories, 13.5, pp. 1-3.
(Continued)

*Primary Examiner* — John A Lane
(74) *Attorney, Agent, or Firm* — Dicke, Billig Czaja, PLLC

(57) ABSTRACT

Memory device might include a controller configured to cause the memory device to determine whether the memory device is waiting to initiate a next phase of an access operation, and in response to determining that the memory device is waiting to initiate the next phase, determine whether there is sufficient available current budget to initiate the next phase in a selected operating mode in response to at least the priority token of the memory device, an expected peak current magnitude for the next phase in the selected operating mode, and additional expected peak current magnitudes for other memory devices. In response to determining that there is sufficient available current budget to initiate the next phase in the selected operating mode, the memory device might output the expected peak current magnitude for the next phase in the selected operating mode from the memory device.

27 Claims, 19 Drawing Sheets

(51) Int. Cl.
  *G11C 16/32*    (2006.01)
  *G06F 1/3206*   (2019.01)
  *G11C 7/22*     (2006.01)
  *G11C 7/10*     (2006.01)
  *G06F 1/3215*   (2019.01)
  *G11C 16/30*    (2006.01)
  *G11C 5/14*     (2006.01)
  *G11C 16/04*    (2006.01)
  *H01L 25/065*   (2023.01)
  *G06F 119/06*   (2020.01)

(52) U.S. Cl.
  CPC .......... *G06F 3/0631* (2013.01); *G06F 3/0683* (2013.01); *G11C 5/14* (2013.01); *G11C 7/1045* (2013.01); *G11C 7/22* (2013.01); *G11C 16/30* (2013.01); *G11C 16/32* (2013.01); *G06F 2119/06* (2020.01); *G11C 16/0483* (2013.01); *H01L 25/0657* (2013.01); *H01L 2225/06562* (2013.01)

(56) References Cited

U.S. PATENT DOCUMENTS

| | | | |
|---|---|---|---|
| 9,417,685 B2 | 8/2016 | Ha et al. | |
| 11,237,617 B2* | 2/2022 | Palmer | G06F 3/0659 |
| 2017/0256955 A1* | 9/2017 | Addepalli | H04L 12/40045 |
| 2017/0263292 A1* | 9/2017 | Grunzke | G11C 5/148 |
| 2020/0210108 A1* | 7/2020 | Palmer | G06F 3/0659 |
| 2021/0055772 A1 | 2/2021 | Guo | |
| 2022/0083241 A1* | 3/2022 | Nubile | G06F 3/0679 |
| 2022/0091788 A1* | 3/2022 | Palmer | G06F 3/0679 |
| 2022/0199180 A1* | 6/2022 | Mannella | G11C 29/26 |
| 2022/0199192 A1* | 6/2022 | Binfet | G06F 1/3225 |
| 2023/0067294 A1* | 3/2023 | Yu | G06F 12/0802 |

OTHER PUBLICATIONS

Shibata et al. "A 1 33Tb 4b/Cell 3D-Flash Memory on a 96-Word-Line-Layer Technology," Bics FLASH, 2019 IEEE, International Solid-State Circuits Conference, pp. 1-170.

* cited by examiner

POWER MANAGEMENT

RELATED APPLICATION

This application claims the benefit of U.S. Provisional Application No. 63/182,015, filed on Apr. 30, 2021, hereby incorporated herein in its entirety by reference.

TECHNICAL FIELD

The present disclosure relates generally to power management in integrated circuit devices and, in particular, in one or more embodiments, the present disclosure relates to methods and apparatus utilizing predictive peak current monitoring and priority levels in power management.

BACKGROUND

Memories (e.g., memory devices) are typically provided as internal, semiconductor, integrated circuit devices in computers or other electronic devices. There are many different types of memory including random-access memory (RAM), read only memory (ROM), dynamic random access memory (DRAM), synchronous dynamic random access memory (SDRAM), and flash memory.

Flash memory has developed into a popular source of non-volatile memory for a wide range of electronic applications. Flash memory typically use a one-transistor memory cell that allows for high memory densities, high reliability, and low power consumption. Changes in threshold voltage (Vt) of the memory cells, through programming (which is often referred to as writing) of charge storage structures (e.g., floating gates or charge traps) or other physical phenomena (e.g., phase change or polarization), determine the data state (e.g., data value) of each memory cell. Common uses for flash memory and other non-volatile memory include personal computers, personal digital assistants (PDAs), digital cameras, digital media players, digital recorders, games, appliances, vehicles, wireless devices, mobile telephones, and removable memory modules, and the uses for non-volatile memory continue to expand.

A NAND flash memory is a common type of flash memory device, so called for the logical form in which the basic memory cell configuration is arranged. Typically, the array of memory cells for NAND flash memory is arranged such that the control gate of each memory cell of a row of the array is connected together to form an access line, such as a word line. Columns of the array include strings (often termed NAND strings) of memory cells connected together in series between a pair of select gates, e.g., a source select transistor and a drain select transistor. Each source select transistor might be connected to a source, while each drain select transistor might be connected to a data line, such as a column bit line. Variations using more than one select gate between a string of memory cells and the source, and/or between the string of memory cells and the data line, are known.

Power consumption is often an important consideration in the design and usage of memory devices. Problems might arise when multiple memory devices are operated concurrently. Such problems could include exceeding power consumption specifications and/or negatively impacting quality of service.

DETAILED DESCRIPTION

Figure 1:
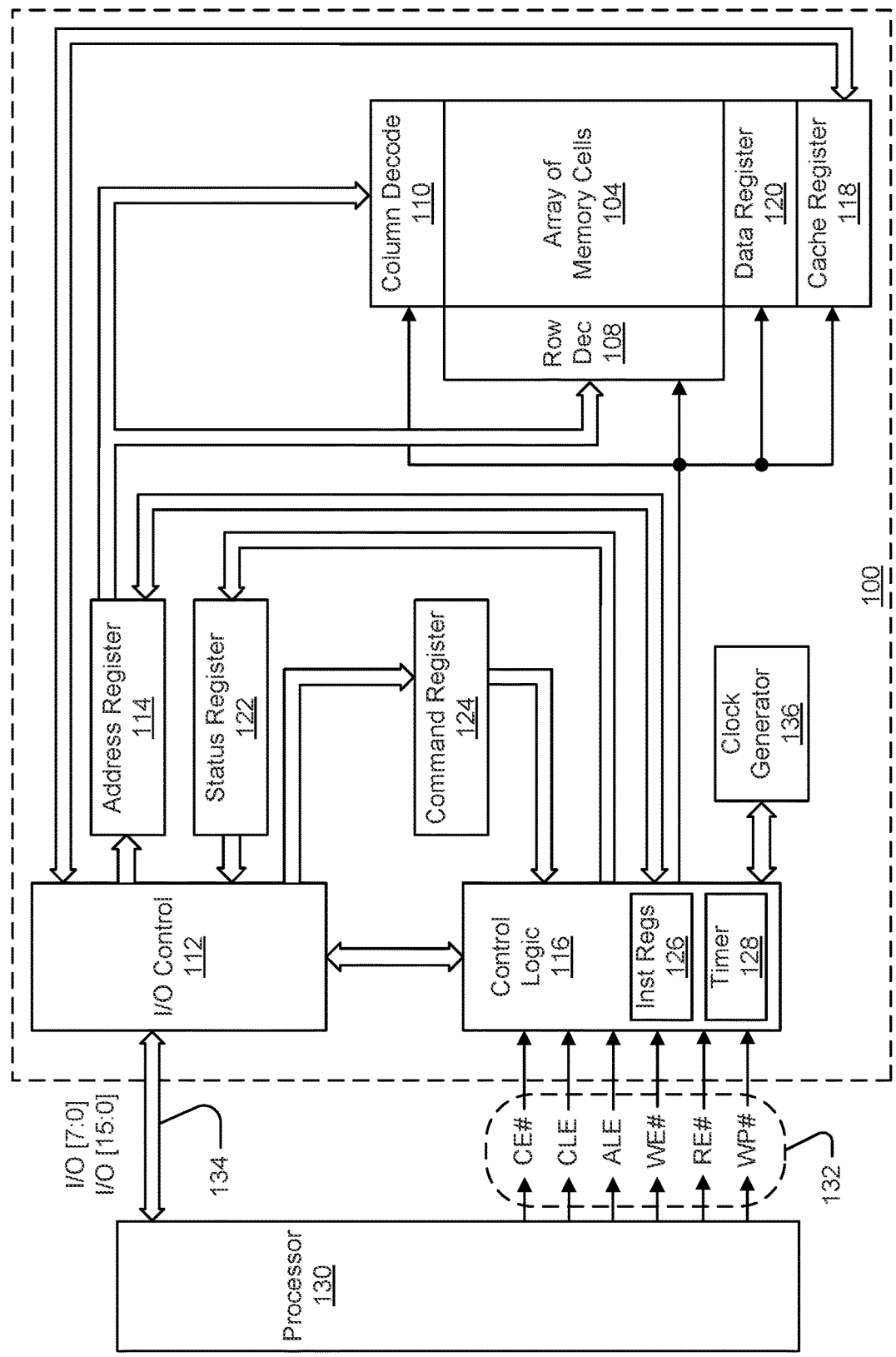
FIG. 1 is a simplified block diagram of a memory in communication with a processor as part of an electronic system, according to an embodiment.

In the following detailed description, reference is made to the accompanying drawings that form a part hereof, and in which is shown, by way of illustration, specific embodiments. In the drawings, like reference numerals describe substantially similar components throughout the several views. Other embodiments might be utilized and structural, logical and electrical changes might be made without departing from the scope of the present disclosure. The following detailed description is, therefore, not to be taken in a limiting sense.

The term "semiconductor" used herein can refer to, for example, a layer of material, a wafer, or a substrate, and includes any base semiconductor structure. "Semiconductor" is to be understood as including silicon-on-sapphire (SOS) technology, silicon-on-insulator (SOI) technology, thin film transistor (TFT) technology, doped and undoped semiconductors, epitaxial layers of a silicon supported by a base semiconductor structure, as well as other semiconductor structures well known to one skilled in the art. Furthermore, when reference is made to a semiconductor in the following description, previous process steps might have been utilized to form regions/junctions in the base semiconductor structure, and the term semiconductor can include the underlying layers containing such regions/junctions.

The term "conductive" as used herein, as well as its various related forms, e.g., conduct, conductively, conducting, conduction, conductivity, etc., refers to electrically conductive unless otherwise apparent from the context. Similarly, the term "connecting" as used herein, as well as its various related forms, e.g., connect, connected, connection, etc., refers to electrically connecting by a conductive path unless otherwise apparent from the context.

It is recognized herein that even where values might be intended to be equal, variabilities and accuracies of industrial processing and operation might lead to differences from their intended values. These variabilities and accuracies will generally be dependent upon the technology utilized in fabrication and operation of the integrated circuit device. As such, if values are intended to be equal, those values are deemed to be equal regardless of their resulting values.

NAND memory is widely used in managed NAND (MNAND) and Solid-State Drive (SSD) systems. Common examples of MNAND might include embedded MultiMediaCard (eMMC) as might be common in SSD systems, embedded USB (eUSB) as might be common in industrial applications, and Universal Flash Storage as might be common in digital cameras, mobile phones and other consumer electronic devices. The capacitive loading of three-dimensional NAND is generally large and might continue to grow as process scaling continues. Various access lines, data lines and voltage nodes might need to be charged or discharged very quickly during sense (e.g., read or verify), program, and erase operations so that memory array access operations can meet the performance specifications that are often required to meet data throughput targets as might be dictated by customer requirements or industry standards, for example. For sequential read or programming, multi-plane operations are often used to increase the system throughput. As a result, typical NAND memory can have peak current usage close to 200 mA, which might be four to five times the average current amplitude. With a typical market requirement of 400-1000 mA of total current demand budget for an MNAND system, it can become challenging to operate more than four NAND memory concurrently.

A variety of techniques have been utilized to manage power consumption of memory systems containing multiple memory devices, many of which rely on a memory controller to stagger the activity of the memory devices seeking to avoid performing high power portions of access operations concurrently in more than one memory device. Various embodiments described herein facilitate power management among multiple dies (e.g., memories) by having dies look to their expected peak current magnitudes, as well as assigned priorities among the dies, and making a decision on how to proceed responsive to the assigned priorities, and to a value indicative of a sum of the expected peak current magnitudes.

FIG. 1 is a simplified block diagram of a first apparatus, in the form of a memory (e.g., memory device) 100, in communication with a second apparatus, in the form of a processor 130, as part of a third apparatus, in the form of an electronic system, according to an embodiment. Some examples of electronic systems include personal computers, personal digital assistants (PDAs), digital cameras, digital media players, digital recorders, games, appliances, vehicles, wireless devices, mobile telephones and the like. The processor 130, e.g., a controller external to the memory device 100, might be a memory controller or other external host device.

Memory device 100 includes an array of memory cells 104 that might be logically arranged in rows and columns. Memory cells of a logical row are typically connected to the same access line (commonly referred to as a word line) while memory cells of a logical column are typically selectively connected to the same data line (commonly referred to as a bit line). A single access line might be associated with more than one logical row of memory cells and a single data line might be associated with more than one logical column. Memory cells (not shown in FIG. 1) of at least a portion of array of memory cells 104 are capable of being programmed to one of at least two target data states.

A row decode circuitry 108 and a column decode circuitry 110 are provided to decode address signals. Address signals are received and decoded to access the array of memory cells 104. Memory device 100 also includes input/output (I/O) control circuitry 112 to manage input of commands, addresses and data to the memory device 100 as well as output of data and status information from the memory device 100. An address register 114 is in communication with I/O control circuitry 112 and row decode circuitry 108 and column decode circuitry 110 to latch the address signals prior to decoding. A command register 124 is in communication with I/O control circuitry 112 and control logic 116 to latch incoming commands.

A controller (e.g., the control logic 116 internal to the memory device 100) controls access to the array of memory cells 104 in response to the commands and might generate status information for the external processor 130, i.e., control logic 116 is configured to perform access operations (e.g., sensing operations [which might include read operations and verify operations], programming operations and/or erase operations) on the array of memory cells 104. The control logic 116 is in communication with row decode circuitry 108 and column decode circuitry 110 to control the row decode circuitry 108 and column decode circuitry 110 in response to the addresses. The control logic 116 might include instruction registers 126 which might represent computer-usable memory for storing computer-readable instructions. For some embodiments, the instruction registers 126 might represent firmware. Alternatively, the instruction registers 126 might represent a grouping of memory cells, e.g., reserved block(s) of memory cells, of the array of memory cells 104.

Control logic 116 might also be in communication with a cache register 118. Cache register 118 latches data, either incoming or outgoing, as directed by control logic 116 to temporarily store data while the array of memory cells 104 is busy writing or reading, respectively, other data. During a programming operation (e.g., write operation), data might be passed from the cache register 118 to the data register 120 for transfer to the array of memory cells 104; then new data might be latched in the cache register 118 from the I/O control circuitry 112. During a read operation, data might be passed from the cache register 118 to the I/O control circuitry 112 for output to the external processor 130; then new data might be passed from the data register 120 to the cache register 118. The cache register 118 and/or the data register 120 might form (e.g., might form a portion of) a page buffer of the memory device 100. A page buffer might further include sensing devices (not shown in FIG. 1) to sense a data state of a memory cell of the array of memory cells 104, e.g., by sensing a state of a data line connected to that memory cell. A status register 122 might be in communication with I/O control circuitry 112 and control logic 116 to latch the status information for output to the processor 130.

The control logic 116 might further be in communication with a timer 128. The timer 128 might be configured to toggle the logic level of an output signal upon reaching an elapsed time, e.g., a programmable interval timer. Such programmable interval timers are well known. For example, the timer 128 might normally provide an output signal having a logic low level, and might briefly toggle the output signal, e.g., for one clock cycle, to a logic high level upon reaching some particular elapsed time. Subsequent to toggling the output signal, the timer 128 might return the output signal to its normal logic level. The particular elapsed time might be responsive to a received control signal. Alternatively, the timer 128 might represent a counter configured to decrement a count value representative of an elapsed time, e.g., in response to cycles of a clock signal. Such operation of counters is well known.

The control logic 116 might further be in communication with a clock generator 136. The clock generator 136 might generate a clock signal for use with various embodiments. Alternatively, the clock generator 136 might be external to the memory device 100. As one example, the clock generator 136 might be in communication with, and might form a part of, the processor 130. The memory device 100 could receive the clock signal over a signal line (not depicted in FIG. 1), whether from the processor 130 or other external device. While not considered essential to embodiments disclosed herein, an example of circuitry for generating the clock signal within the memory device 100 might be found with reference to U.S. Pat. No. 9,417,685 issued Aug. 16, 2016 to Ha et al.

Memory device 100 receives control signals at control logic 116 from processor 130 over a control link 132. The control signals might include a chip enable CE #, a command latch enable CLE, an address latch enable ALE, a write enable WE #, a read enable RE #, and a write protect WP #. Additional or alternative control signals (not shown) might be further received over control link 132 depending upon the nature of the memory device 100. Memory device 100 receives command signals (which represent commands), address signals (which represent addresses), and data signals (which represent data) from processor 130 over a multiplexed input/output (I/O) bus 134 and outputs data to processor 130 over I/O bus 134.

For example, the commands might be received over input/output (I/O) pins [7:0] of I/O bus 134 at I/O control circuitry 112 and might then be written into command register 124. The addresses might be received over input/output (I/O) pins [7:0] of I/O bus 134 at I/O control circuitry 112 and might then be written into address register 114. The data might be received over input/output (I/O) pins [7:0] for an 8-bit device or input/output (I/O) pins [15:0] for a 16-bit device at I/O control circuitry 112 and then might be written into cache register 118. The data might be subsequently written into data register 120 for programming the array of memory cells 104. For another embodiment, cache register 118 might be omitted, and the data might be written directly into data register 120. Data might also be output over input/output (I/O) pins [7:0] for an 8-bit device or input/output (I/O) pins [15:0] for a 16-bit device. Although reference might be made to I/O pins, they might include any conductive nodes providing for electrical connection to the memory device 100 by an external device (e.g., processor 130), such as conductive pads or conductive bumps as are commonly used.

It will be appreciated by those skilled in the art that additional circuitry and signals can be provided, and that the memory device 100 of FIG. 1 has been simplified. It should be recognized that the functionality of the various block components described with reference to FIG. 1 might not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Additionally, while specific I/O pins are described in accordance with popular conventions for receipt and output of the various signals, it is noted that other combinations or numbers of I/O pins (or other I/O node structures) might be used in the various embodiments.

Figure 2:
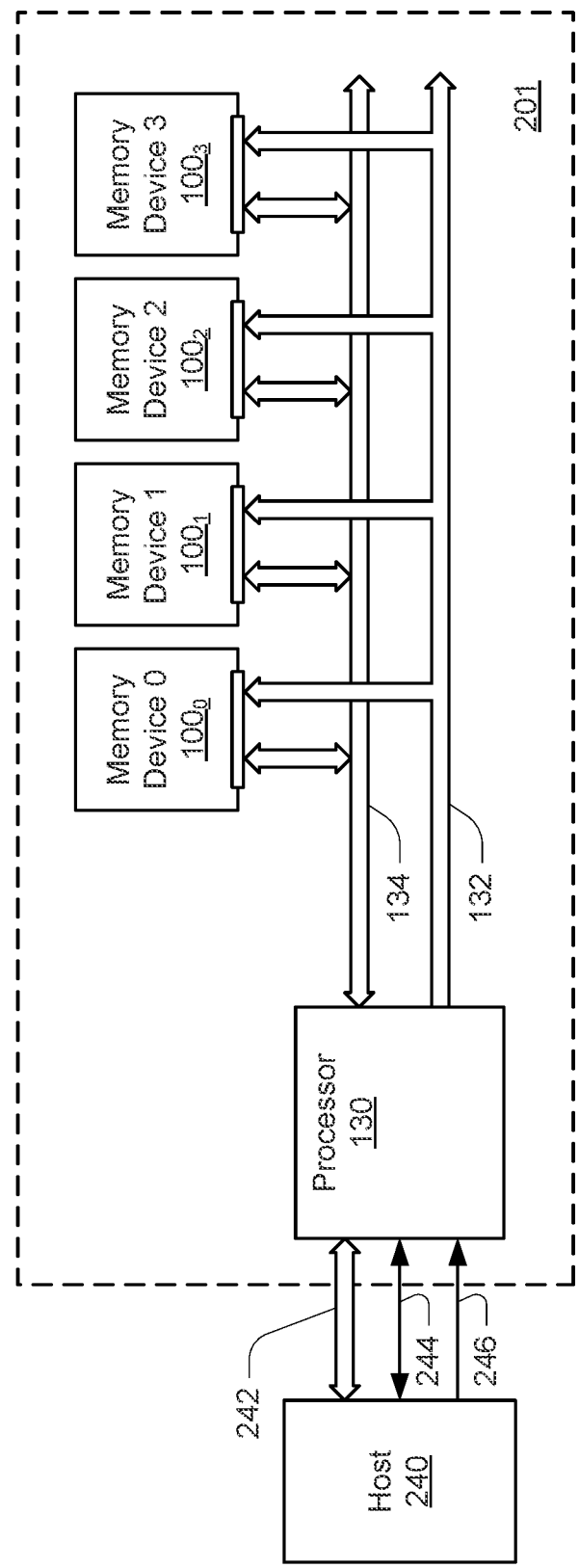
FIG. 2 is a simplified block diagram of a memory module in communication with a host as part of an electronic system, according to another embodiment.

A given processor 130 might be in communication with one or more memory devices 100, e.g., dies. FIG. 2 is a simplified block diagram of an apparatus in the form of a memory module 201 in communication with a host 240 as part of an electronic system, according to another embodiment. Memory devices 100 and processor 130 might be as described with reference to FIG. 1. Although memory module (e.g., memory package) 201 is depicted with four memory devices 100 (e.g., dies), memory module 201 could have fewer or more memory devices 100. As used herein, a die will refer to an individual integrated circuit device, which might include a memory device 100.

Because processor 130 (e.g., a memory controller) is between the host 240 and the memory devices 100, communication between the host 240 and the processor 130 might involve different communication links than those used between the processor 130 and the memory devices 100. For example, the memory module 201 might be an Embedded MultiMediaCard (eMMC) of a solid state drive (SSD). In accordance with existing standards, communication with an eMMC might include a data link 242 for transfer of data (e.g., an 8-bit link), a command link 244 for transfer of commands and device initialization, and a clock link 246 providing a clock signal for synchronizing the transfers on the data link 242 and command link 244. The processor 130 might handle many activities autonomously, such as error correction, management of defective blocks, wear leveling and address translation.

Figure 3:
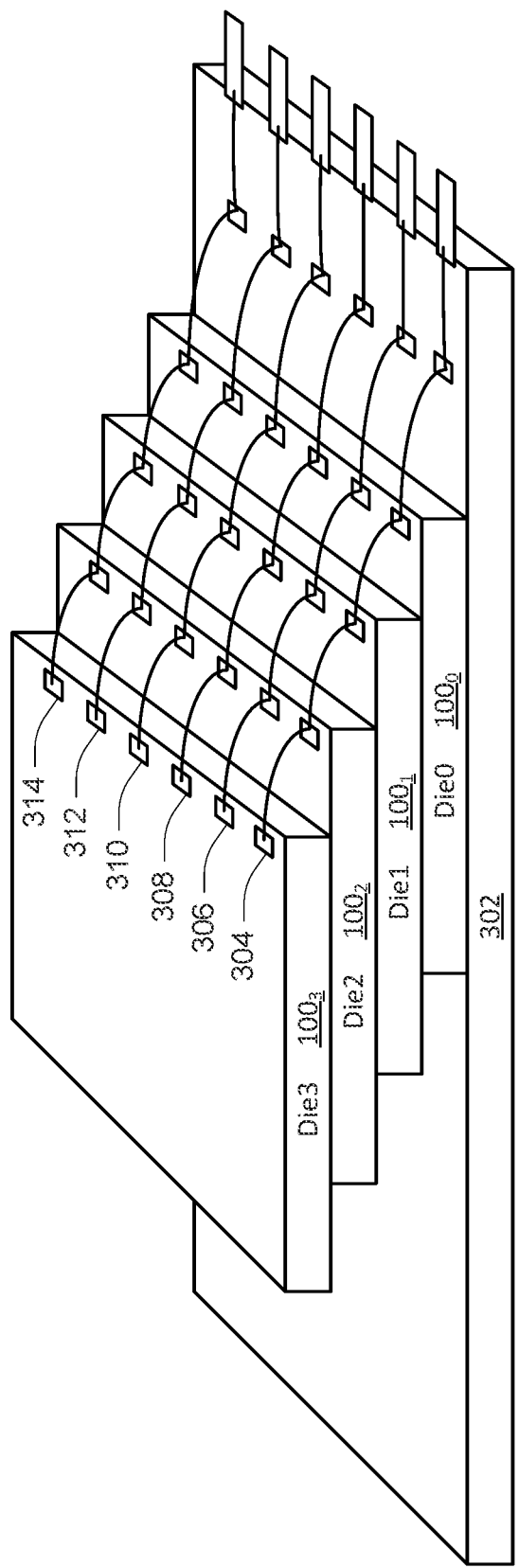
FIG. 3 is a perspective view of a representation of a multi-die package according to an embodiment.

FIG. 3 is a perspective view of a representation of a multi-die package 302 according to an embodiment. Multi-die package 302 is depicted to include four dies 100 (i.e., $100_0$-$100_3$ corresponding to Die0-Die3), although multi-die packages could have fewer or more such dies. Each of the dies (e.g., memory devices) 100, as well as the package 302, might include a node 304 (e.g., a conductive pad) for providing a ready/busy control signal RB #. The ready/busy control signal might be used to indicate to a host device or to the dies 100 in the multi-die package 302 whether one or more of the dies 100 are busy performing an access operation. As such, the nodes 304 might be commonly connected. Each of the dies 100, as well as the package 302, might include a node 306 for providing input/output (I/O) signals. Note that each node 306 might represent more than one physical node, e.g., one conductive pad for each signal of the I/O bus 134 of FIG. 1 for each of the dies 100 and the multi-package 302. The nodes 306 (e.g., for a given signal of the I/O bus 134) might be commonly connected. Each of the dies 100, as well as the package 302, might include a node 308 for providing control signals. Note that each node 308 might represent more than one physical node, e.g., one conductive pad for each signal of the control link 132 of FIG. 1 for each of the dies 100 and the multi-package 302. The nodes 308 (e.g., for a given signal of the control link 132) might be commonly connected.

Each of the dies 100, as well as the package 302, might include a node 310 (e.g., a pad) for providing a chip enable signal CE #. The chip enable signal might be used to enable access to the dies 100 in the multi-die package 302. As such, the nodes 310 might be commonly connected. Each of the dies 100, as well as the package 302, might include a node 312 for providing a signal HC #. The signal HC # might be shared between the dies 100 and, for some embodiments, with a host device. In conjunction with secondary clock cycles of the clock signal ppmCLK, as described in more detail later, the signal HC # can provide an indication of expected peak current magnitude, and, for some embodiments, device priority, to other devices sharing the clock signal ppmCLK. The nodes 312 might be commonly connected. For some embodiments, the connection to the multi-die package 302 might be eliminated. Each of the dies 100 might include a node 314 for sharing the clock signal ppmCLK. The clock signal might be shared between the dies 100. The clock signal ppmCLK might be generated by a clock generator of one of the dies 100, or received from a device external to all of the dies 100. Use of the clock signal will be described with reference to subsequent figures. The nodes 314 might be commonly connected. For some embodiments, e.g., if the clock signal ppmCLK is generated by one of the dies 100, the connection to the multi-die package 302 might be eliminated.

Figure 4:
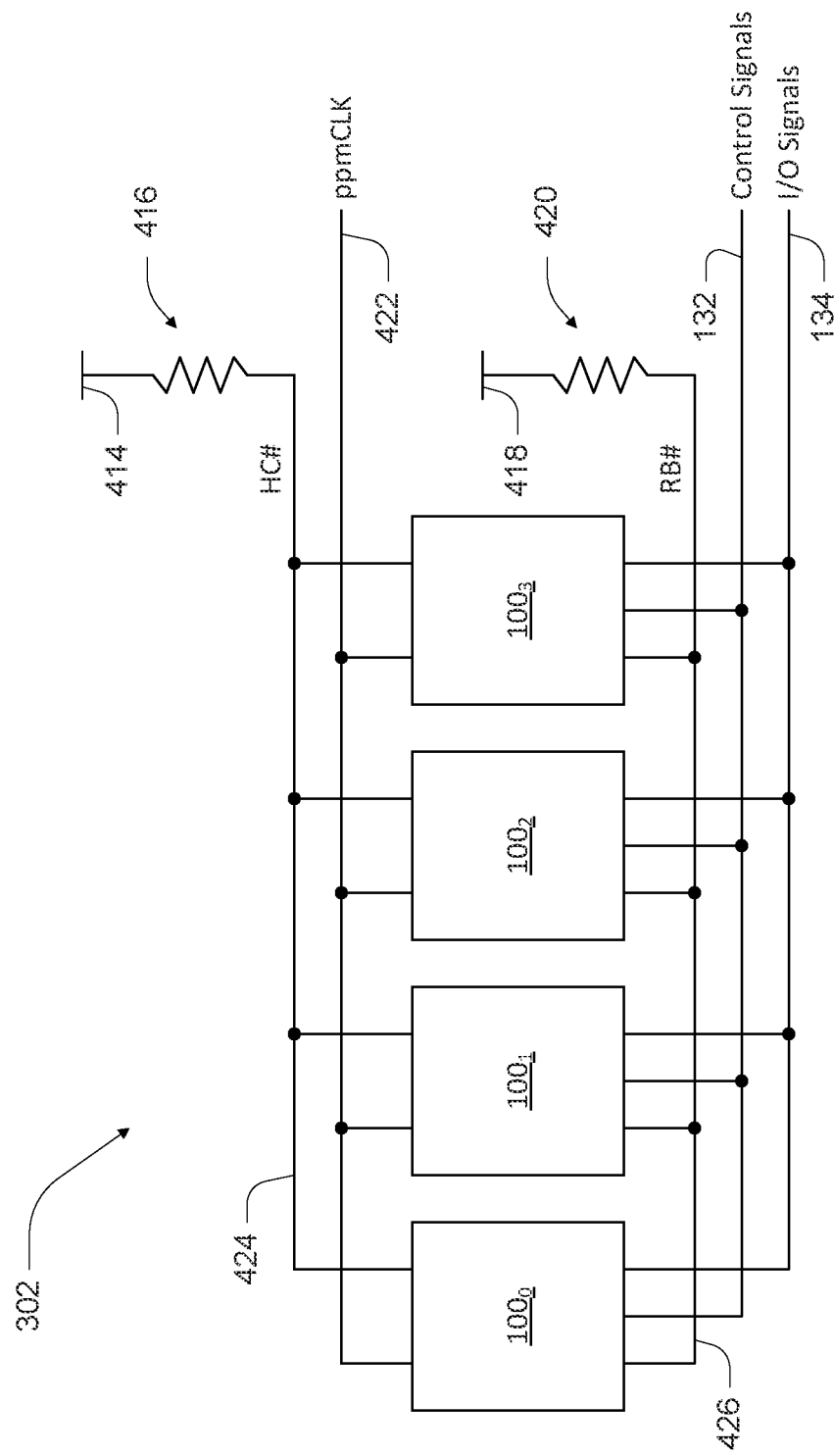
FIG. 4 is a schematic representation of a multi-die package according to an embodiment.

FIG. 4 is a schematic representation of the multi-die package 302 including four dies 100 (e.g., $100_0$-$100_3$) according to an embodiment. The clock signal ppmCLK is commonly shared between the dies 100 through a clock signal line 422. The signal HC # is commonly shared between the dies 100 through a signal line 424. The signal HC # might have a nominal condition of normally being pulled to a particular state (e.g., pulled high), such as by connecting the signal line 424 to a voltage supply node 414, configured to receive a supply voltage such as Vcc, through a resistor 416, sometimes collectively referred to as a weak pull-up resistor, or simply a pull-up resistor.

The ready/busy control signal RB # is commonly shared between the dies 100 through a control signal line 426. The ready/busy control signal RB # might be normally pulled to a particular state (e.g., pulled high), such as by connecting the ready/busy control signal line 426 to a voltage supply node 418 through a resistor 420. Each of the dies 100 is further commonly connected to a control link 132 and to an I/O bus 134.

Various embodiments will be discussed with reference to the multi-die package 302 of FIG. 4. It will be apparent that such embodiments could utilize fewer or more dies 100 than those depicted in FIG. 4. In general, access operations of the dies 100 might be divided into a number of phases. These phases might be determined such that the access operation could be paused upon completion of one phase and before initiation of the next phase without unnecessarily hindering completion of the access operation other than causing a delay. For example, it might be undesirable to pause the access operation if pausing at that point would require discharge of some node, and that charge would have to be restored to the node before initiating the next phase. Similarly, it might be undesirable to pause the access operation if pausing at that point would risk loss or corruption of data values.

Each phase might correspond to a respective duration, which might be predefined (e.g., a phase that has the same or similar timing characteristics each time it is performed) or variable (e.g., a phase whose timing characteristics vary based on detection of some analog characteristic). Each phase might further correspond to a respective expected peak current magnitude. Table 1 provides one example of magnitudes of expected peak currents that might be assigned to various phases of an access operation.

TABLE 1

| Level | Encoded Value | Expected Peak Current Magnitude |
|---|---|---|
| 0 | 000 | <=25 mA |
| 1 | 001 | <=50 mA |
| 2 | 010 | <=75 mA |
| 3 | 011 | <=100 mA |

TABLE 1-continued

| Level | Encoded Value | Expected Peak Current Magnitude |
|---|---|---|
| 4 | 100 | <=125 mA |
| 5 | 101 | <=150 mA |
| 6 | 110 | <=175 mA |
| 7 | 111 | <=200 mA |

While the example of Table 1 depicts eight different levels of expected peak current magnitude, other number of levels of expected peak current magnitude might be used with embodiments. For example, using a four-digit encoded value (e.g., a digital representation), sixteen levels of expected peak current magnitude might be defined, which might provide a more granular control of total current usage of a multi-die system. In addition, while the example of Table 1 depicts levels of expected peak current magnitude that differ from adjacent levels of expected peak current magnitude by a constant difference, the current difference between adjacent levels need not be constant. The expected peak current magnitude might not represent actual peak current magnitude, but might instead represent a peak current magnitude to be used in determining whether and how to proceed with a next or initial phase of an access operation. For example, actual peak current magnitude might be higher, but might further be of such short duration as to be deemed de minimis.

Various embodiments facilitate power management in a multi-die package by having the dies of the package look to their expected peak current magnitudes, as well as assigned priorities, and make a decision on how to proceed responsive to the assigned priorities, and to a value indicative of a sum of the expected peak current magnitudes. Each die can broadcast their expected peak current magnitude to remaining dies, and each die can make informed decisions based on a sum of the expected peak current magnitudes. For example, a die might decide to pause an access operation after completion of its present phase of an access operation, or initiate the next phase in a different operating mode, e.g., a lower peak-current operating mode, if performance of the next phase under normal operating conditions would be deemed to exceed a total current demand budget of the package.

With regard to broadcasting expected peak current magnitudes, a die might determine whether it is expected to transition to a next phase of an operation, which might be a next phase of a present operation or an initial phase of a new operation. If such a transition is expected, it might determine its expected peak current magnitude for the next phase. If no such transition is expected, it might determine its expected peak current magnitude to be the expected peak current magnitude of its present phase (which might include being idle). Note that a die that is idle, e.g., not actively performing a phase of any access operation, might be deemed to have a base magnitude of expected peak current magnitude, which might be the lowest magnitude of the defined plurality of expected peak current magnitudes. Further note that while an idle die might be deemed to have an expected peak current magnitude corresponding to the lowest magnitude of the plurality of expected peak current magnitudes, the lowest magnitude of the plurality of expected peak current magnitudes might be sufficient to further correspond to certain phases of operations actively being performed by a die.

Alternatively, if the next phase of its operation can be operated in a low-peak-current operating mode, and such operation is enabled, the die might recalculate the total of the expected peak current magnitudes using an expected peak current magnitude of the low-peak-current operating mode of the next phase. As one example, low-peak-current operating modes might include slowing down charge pumps or other voltage generation devices to reduce the rate of current usage. This might increase the duration of the next phase, e.g., nodes might not reach intended voltage levels as quickly. If the total current demand budget is deemed to be exceeded using the expected peak current magnitude of the next phase under normal operating conditions, but not deemed to be exceeded using the expected peak current magnitude of the low-peak-current operating mode of the next phase, the die might broadcast to remaining dies that its expected peak current magnitude has the magnitude corresponding to the low-peak-current operating mode of the next phase of its operation and proceed toward performing the next phase in the low-peak-current operating mode.

For some embodiments, decisions on whether to proceed in a normal or low-peak-current operating mode, or to pause, might be based upon a die's own priority level, and the expected peak current magnitudes of all of the dies sharing a current budget. For example, each priority level might correspond to a respective reserve amount, and a die could determine if there was sufficient available current budget to proceed in a normal operating mode, or a low-peak-current operating mode, if the current budget were to be reduced by the reserve amount. Higher priority levels might correspond to lower current budget reserve amounts. In this manner, dies with higher priority levels might be expected to have a higher likelihood of being able to proceed, as well as a higher likelihood of being able to proceed in a normal operating mode. Consider the example of priority tokens 11, 10, 01 and 00, where each priority token is an indication of a priority level. For example, 11 might represent the highest priority, 10 might represent a lesser priority than 11, and 01 might represent a lesser priority than 10. The priority token 00 might indicate an idle die, e.g., suspended with no queued command to perform an access operation, thus effectively having a lowest priority. The 11 priority token might correspond to a reserve amount of 0 mA, the 10 priority token might correspond to a reserve amount of 90 mA, and the 01 priority token might correspond to a reserve amount of 180 mA.

A priority token might be assigned to a die by an application calling for access of the die, and might further be modified, e.g., increased in priority level, in response to an amount of time a die has been idle waiting to initiate its next phase of its access operation. Alternatively, priority tokens might be assigned based on the type of access operation being performed. For example, foreground operations, e.g., a write operation in response to a write command, might have a higher priority level than background operations, e.g., a write operation being performed in response to garbage collection or wear leveling. Read operations might have a higher priority than write operations, which might have a higher priority than erase operations. Again, these assignments by operation type might also be modified in response to an amount of time a die has been waiting to initiate its next phase. Selection of different priority levels might be guided by a desired QoS (Quality of Service) of a service being supported by a multi-die package.

Figure 5A:
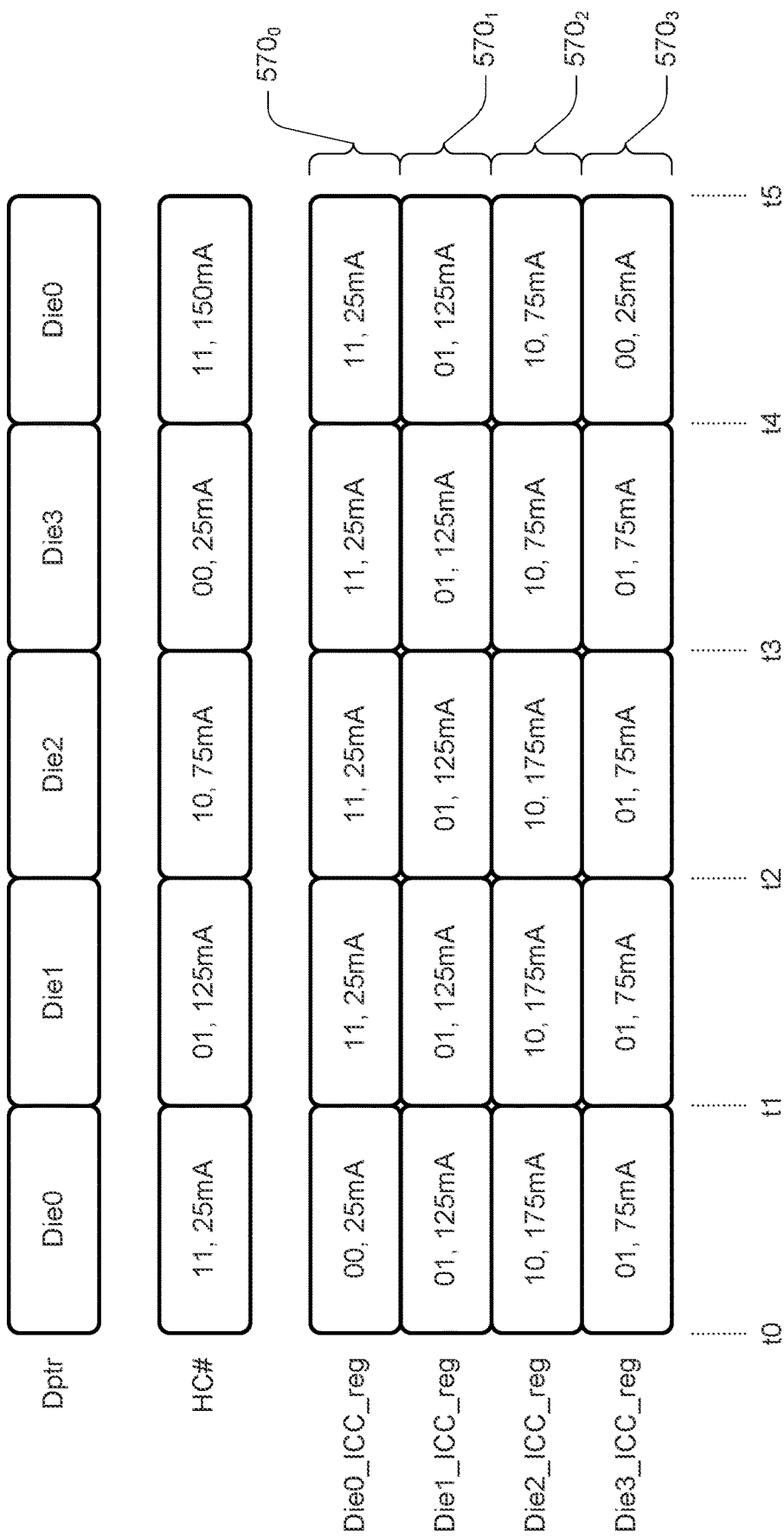
FIGS. 5A-5B are conceptual timing diagrams of signals and register contents in accordance with embodiments.

FIG. 5A is a conceptual timing diagram of signals and register contents implementing a budget reserve by priority level, such as discussed in the foregoing example. In the example of FIG. 5A the current budget, e.g., the total current budget, might be 400 mA to be shared by four dies 100, e.g., Die0 $100_0$, Die1 $100_1$, Die2 $100_2$, and Die3 $100_3$. Each die 100 might have four registers 570, e.g., Die0_ICC_reg $570_0$, Die1_ICC_reg $570_1$, Die2_ICC_reg $570_2$, and Die3_ICC_reg $570_3$, for storing information, e.g., current demand information, regarding respective expected peak current magnitudes and/or respective priority tokens for each of the dies 100. For some embodiments, an individual die 100 might not store the priority tokens for other dies 100 as the decision to proceed might be made without regard to the priority tokens of the other dies 100.

The die pointer, or memory device pointer, Dptr might represent an indication of when each die, or memory device, 100 is to broadcast its expected peak current magnitude and, for embodiments storing priority tokens for each of the dies 100 of a package 302, its priority token. As will be described in more detail with reference to FIG. 6, this could include a single clock signal that each die 100 counts in a repeating fashion, and then responds when the count corresponds to that die 100. Alternatively, the die pointer Dptr might include a respective control signal for each of the dies 100, with each of the dies 100 responding when its control signal has a predetermined logic level. Prior to a die 100 broadcasting its current demand information, it might determine its upcoming expected peak current magnitude. While not considered essential to embodiments disclosed herein, U.S. Patent Application Publication No. 2021/0055772 A1 to Guo, which is commonly assigned, discloses methods and apparatus for determination of expected peak current magnitude. As will be described in more detail with reference to FIG. 6, broadcasting of the current demand information might include coding the shared HC # signal. For the example of FIG. 5A, the various levels of expected peak current magnitude might correspond to the levels of Table 1.

Prior to time t0 of FIG. 5A, Die0 might be idle, e.g., having a priority token of 00 and having an expected peak current magnitude of 25 mA, e.g., less than or equal to 25 mA. Die1 might have a priority token of 01 and might be performing a phase of an access operation, e.g., having an expected peak current magnitude of 125 mA, e.g., less than or equal to 125 mA. Die2 might have a priority token of 10 and might be performing a phase of an access operation, e.g., having an expected peak current magnitude of 175 mA, e.g., less than or equal to 175 mA. Die3 might have a priority token of 01 and might be performing a phase of an access operation, e.g., having an expected peak current magnitude of 75 mA, e.g., less than or equal to 75 mA. Die1, Die2 and Die3 might be performing different access operations, or might be performing the same access operation, but at different phases of that access operation.

Further prior to time t0 of FIG. 5A, Die0 might receive a command indicating a desire to initiate an access operation, and might be assigned a priority token of 11 for that access operation. For example, a host 240 might deem the access operation to be of higher priority than the access operations being performed by the dies Die1, Die2 and Die3. The initial phase of the access operation for Die0 might have an expected peak current magnitude of 150 mA in a normal operating mode, and might not have a low-peak-current operating mode. With a total current budget of 400 mA, and with Die1, Die2 and Die3 having expected peak current magnitudes of 125 mA, 175 mA and 75 mA, respectively, Die0 would thus determine that it could not initiate its access operation as there is insufficient available current budget. As such, its expected peak current magnitude would be expected to remain at the level of an idle die, e.g., 25 mA, and Die0 might broadcast its current demand information between times t0 and t1 as an expected peak current magnitude of 25 mA and, optionally, a priority token of 11. Each of the dies might then update their register $570_0$ accordingly. An available current budget might be sufficient if a sum of the expected peak current magnitudes of each other die of a multi-die package, plus the expected peak current magnitude for the die making the determination if it were to initiate its next phase, is less than (e.g., less than or equal to) the available current budget. The available current budget might be insufficient if the sum of the expected peak current magnitudes of each other die of a multi-die package, plus the expected peak current magnitude for the die making the determination if it were to initiate its next phase, is greater than the available current budget.

Prior to time t1 of FIG. 5A, Die1 might determine that it is still performing its phase of its access operation, such that no decision to proceed is relevant. As such, its expected peak current magnitude would be expected to remain at 125 mA, and Die1 might broadcast its current demand information between times t1 and t2 as an expected peak current magnitude of 125 mA and, optionally, a priority token of 01. Each of the dies might then update their register $570_1$ accordingly. As used herein, updating a register 570 might include making no change to that register 570 where the new current demand information is the same as the prior current demand information. In addition, updating a register 570 might include overwriting a prior version of the current demand information of a die broadcasting updated current demand information.

Prior to time t2 of FIG. 5A, Die2 might complete its phase of its access operation and might determine that a subsequent phase of its access operation has an expected peak current magnitude of 175 mA in a normal operating mode, and an expected peak current magnitude of 75 mA in a low-peak-current operating mode. Having the priority token of 10, the total current budget of 400 mA might be reduced the corresponding reserve amount of 90 mA, and by a sum of the current budget allocated to the remaining dies. For example, 400 mA−90 mA−25 mA−125 mA−75 mA equals 85 mA. Die2 might thus determine that it could not proceed in its normal operating mode as there is insufficient available current budget, but could proceed in its low-peak-current operating mode as there is sufficient available current budget. As such, its expected peak current magnitude would be expected to reduce to 75 mA, and Die2 might broadcast its current demand information between times t2 and t3 as an expected peak current magnitude of 75 mA and, optionally, a priority token of 10. Each of the dies might then update their register $570_2$ accordingly.

Prior to time t3 of FIG. 5A, Die3 might complete its access operation and might determine that it has no subsequent access operation to perform. Being idle, it might reduce its priority token to 00, and might determine its expected peak current magnitude to be 25 mA. As such, Die3 might broadcast its current demand information between times t3 and t4 as an expected peak current magnitude of 25 mA and, optionally, a priority token of 00. Each of the dies might then update their register $570_3$ accordingly.

Prior to time t4 of FIG. 5A, Die0 might determine that it would have sufficient available current budget to initiate its access operation. For example, having the priority token of 11, the current budget of 400 mA might be reduced only by the expected peak current magnitudes of the remaining dies. Without a current budget reserve, the available current budget for Die0 would equal 400 mA−125 mA−75 mA−25 mA, or 175 mA. Die0 might thus determine that it could proceed in its normal operating mode as there is sufficient available current budget. As such, Die0 might broadcast its current demand information between times t4 and t5 as an expected peak current magnitude of 150 mA and, optionally, a priority token of 11. Each of the dies might then update their register $570_0$ accordingly.

Figure 5B:
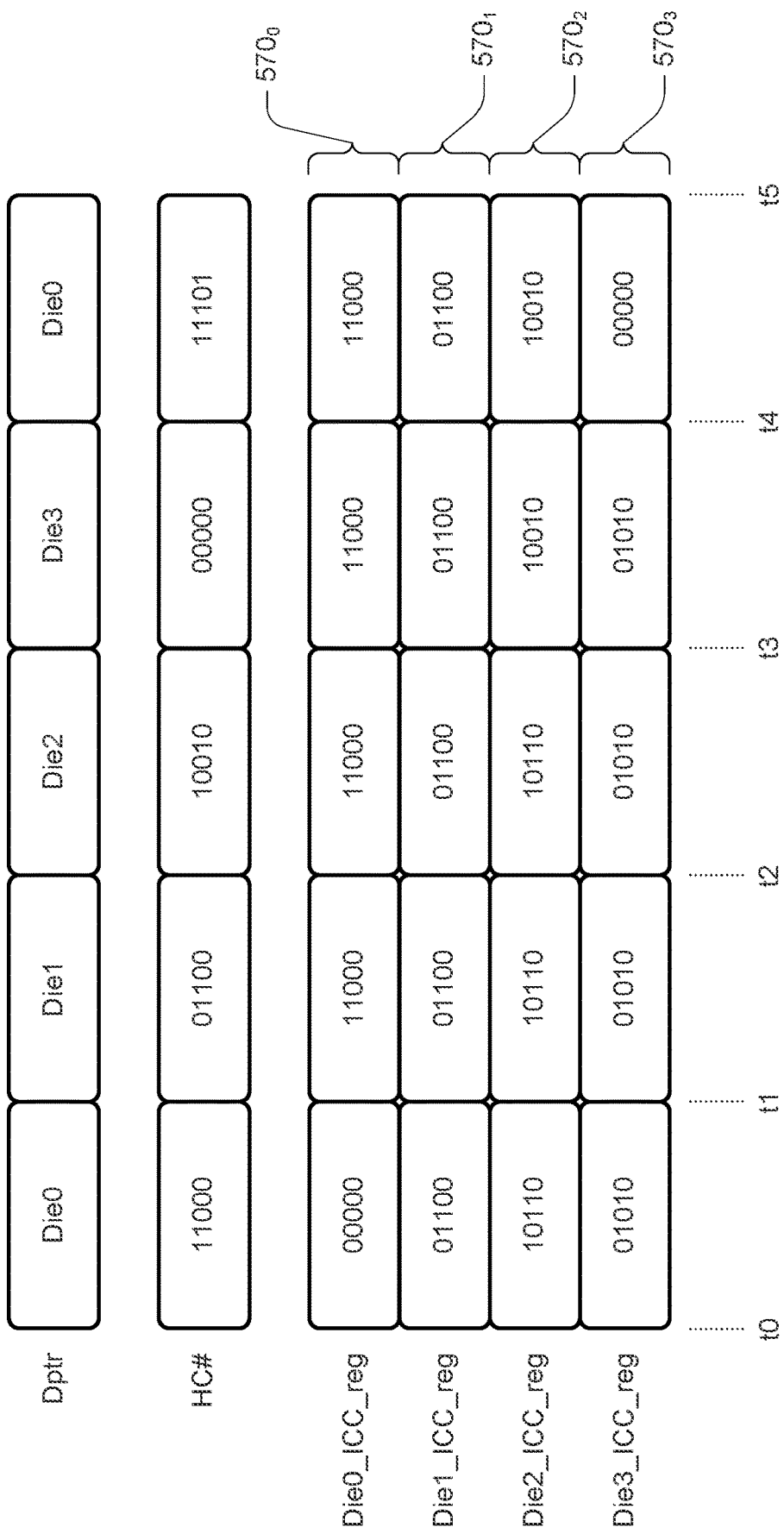

FIG. 5B is a conceptual timing diagram of signals and register contents for an embodiment such as described with reference to FIG. 5A and using the encoded values of Table 1 for communicating and storing the values of the priority tokens and expected peak current magnitudes. In the example of FIG. 5B, the first two digits of the five-digit values of the signal HC # and of the contents of the registers 570 might represent the priority token, while the last three digits of the five-digit values of the signal HC # and of the contents of the registers 570 might represent the expected peak current magnitudes.

Figure 6:
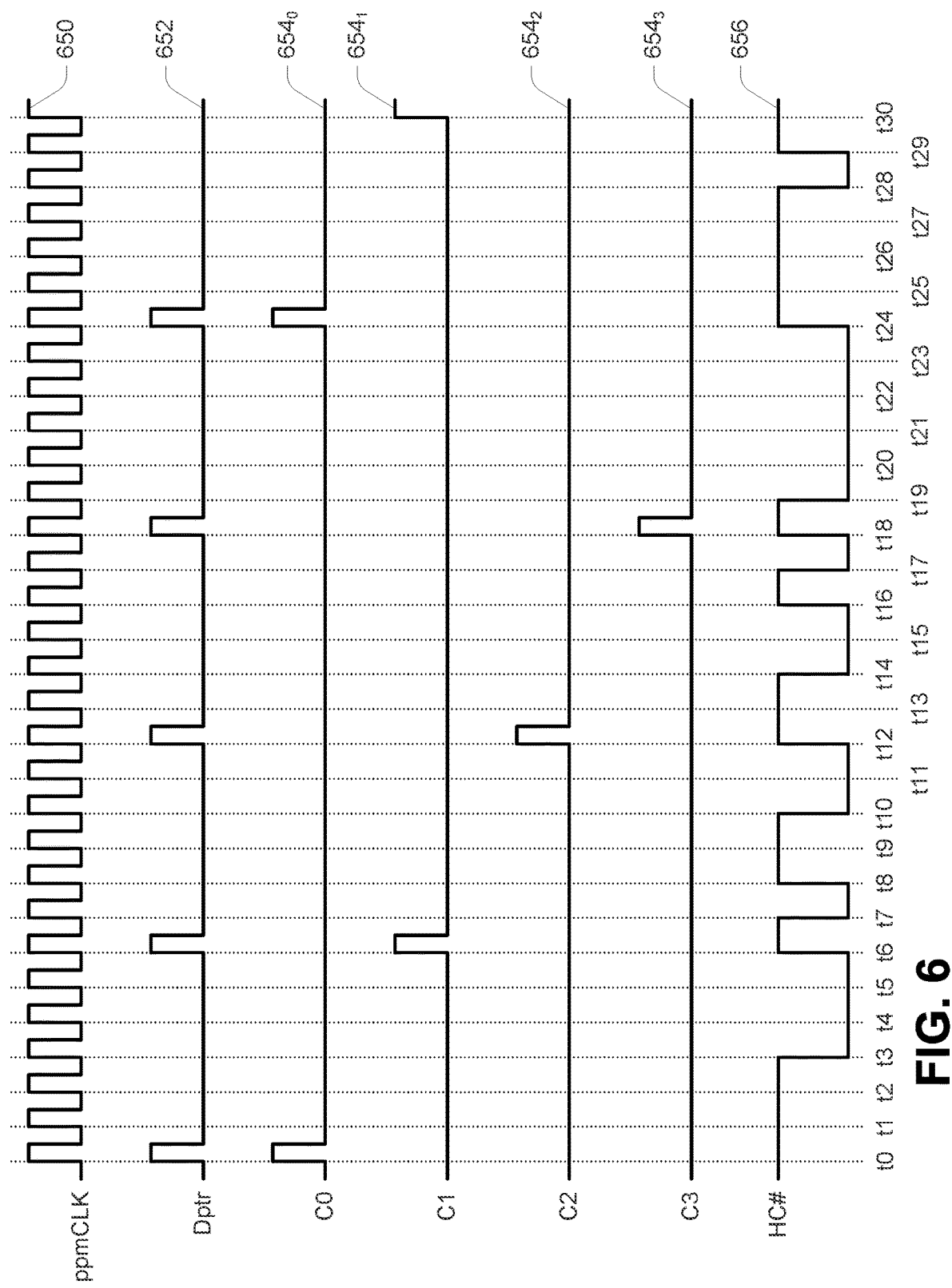
FIG. 6 is a timing diagram depicting clock and other signals in accordance with an embodiment.

FIG. 6 is one example of a timing diagram depicting clock and other signals in accordance with an embodiment. FIG. 6 assumes a multi-die package such as depicted in FIG. 4 having four dies 100, and corresponding to the current demand information as presented with respect to FIGS. 5A-5B. Various embodiments provide each die (e.g., in sequence) an opportunity to evaluate its expected peak current magnitude for some time period (e.g., future time period) to determine whether to continue or pause its operation, and to broadcast its expected peak current magnitude prior to or during that time period to remaining dies. In FIG. 6, trace 650 might represent the clock signal ppmCLK.

For one embodiment, trace 652 might represent a die pointer Dptr generated by dividing the clock signal ppmCLK. For example, the control signal of trace 652 might exhibit a pulse every X cycles of the clock signal ppmCLK, where X=6 in this example. In turn, each of the dies $100_0$-$100_3$ might count pulses of die pointer Dptr in a repeating fashion, e.g., counting from 0 through 3, and then repeating the sequence from a count of 0 in response to a subsequent pulse of the die pointer Dptr. Each of the dies $100_0$-$100_3$ might be assigned a respective count value. In this manner, die $100_0$ might respond to each count of 0, die $100_1$ might respond to each count of 1, die $100_2$ might respond to each count of 2, and die $100_3$ might respond to each count of 3. The value of X might be selected in response to a desired number of cycles of the clock signal ppmCLK for use in broadcasting expected peak current magnitude to other dies, as will be described in more detail infra. Using the example of two-digit priority tokens, two clock cycles might be used for the broadcast of that digital representation. In addition, using the example of Table 1, representing the various magnitudes of expected peak current magnitude using three digits of data, three clock cycles might be used for the broadcast of that digital representation. A value of X might then be equal to or greater than the number of clock cycles used for the broadcast.

Alternatively, each die 100 might be responsive to a separate control signal. For example, traces $654_0$-$654_3$ might represent counter signals C0-C3, respectively. The control signals of traces $654_0$-$654_3$ might exhibit a pulse every D*X cycles of the clock signal ppmCLK, where D=4 and X=6 in this example. The value of D might equal a number of dies sharing the clock signal ppmCLK, and a number of counter signals might equal D. The value of X might be selected in response to a desired number of cycles of the clock signal ppmCLK for use in broadcasting expected peak current magnitude and, optionally, a priority token, to other dies, as will be described in more detail infra, and the pulses of traces $654_0$-$654_3$ might be staggered from one another by X cycles of the clock signal ppmCLK. In this embodiment, each die $100_0$-$100_3$ might be responsive to a respective counter signal C0-C3. For example, die $100_0$ might respond to the counter signal C0 of trace $654_0$, die $100_1$ might respond to the counter signal C1 of trace $654_1$, die $100_2$ might respond to the counter signal C2 of trace $654_2$, and die $100_3$ might respond to the counter signal C3 of trace $654_3$.

Furthermore, the counter signals C0-C3 of the traces $654_0$-$654_3$ might be provided to each die $100_0$-$100_3$ as a combined control signal having D digits of information. Each of the dies $100_0$-$100_3$ might be assigned a respective value of the combined control signal. In this manner, die $100_0$ might respond to a value (e.g., digital value) of $1000$, die $100_1$ might respond to a value of 0100, die $100_2$ might respond to a value of 0010, and die $100_3$ might respond to a value of 0001. While not considered essential to embodiments disclosed herein, U.S. Pat. No. 9,417,685 to Ha et al., which is commonly assigned, describes circuitry of a type that might be used to generate the counter signals C0-C3.

The following example of broadcasting current demand information will use the counter signals C0-C3 for determining which die $100_0$-$100_3$ is designated to broadcast its current demand information. However, it will be apparent that any method of sequentially cycling through the dies might be used. Various embodiments utilize a shared signal, such as the signal HC #, to provide an encoded value (e.g., a digital representation) of the current demand information by one die of a multi-die package to each remaining die of that multi-die package sharing the signal HC # of trace 656. Note that although the counter signals C0-C3 of traces $654_0$-$654_3$ are depicted to align with the clock signal ppmCLK of trace 650 in FIG. 6 as a matter of convenience, some delay might be expected when generating the counter signals C0-C3 from the clock signal ppmCLK, such that time t0 for the counter signals C0-C3 might not align with time t0 for the clock signal ppmCLK. Similarly, time t0 for the signal HC # might not align with time t0 for the clock signal ppmCLK. However, a transition of one of these signals at a particular time might be deemed to be responsive to a transition of the clock signal ppmCLK corresponding to that particular time. Each time period of FIG. 6, e.g., t0-t1, t1-t2, t3-t4, etc., might correspond to one clock cycle of the clock signal ppmCLK.

With reference to FIG. 6, trace $654_0$ might transition to a first logic level at time t0 and at time t24, trace $654_1$ might transition to the first logic level at time t6 and at time t30, trace $654_2$ might transition to the first logic level at time t12 and at time t36 (not depicted in FIG. 6), and trace $654_3$ might transition to the first logic level at time t18 and at time t42 (not depicted in FIG. 6), and this pattern might continue while the dies 100 are active. Traces $654_0$-$654_3$ might otherwise have a second logic level different than their first logic level. For the traces 654, their first logic level might be a logic high level and their second logic level might be a logic low level, for example.

In this example, the die $100_0$ might be designated at time t0, e.g., in response to trace $654_0$ transitioning to the first logic level. The die $100_0$ might then broadcast its current demand information by encoding the signal HC # of trace 656 to represent the five-digit value of 11000, e.g., over the course of one or more subsequent cycles of the clock signal ppmCLK of trace 650. For example, the die $100_0$ might cause the signal HC # to have its first logic level during time periods t1-t2 and t2-t3, and to have its second logic level during time periods t3-t4, t4-t5 and t5-t6, thereby representing the digital value 11000.

The die $100_1$ might be designated at time t6, e.g., in response to trace $654_1$ transitioning to the first logic level. The die $100_1$ might then broadcast its current demand information by encoding the signal HC # to represent the five-digit value of 01100. For example, the die $100_1$ might cause the signal HC # to have its second logic level during time period t7-t8, to have its first logic level during time periods t8-t9 and t9-t10, and to have its second logic level during time periods t10-t11 and t11-t12, thereby representing the digital value 01100.

The die $100_2$ might be designated at time t12, e.g., in response to trace $654_2$ transitioning to the first logic level. The die $100_2$ might then broadcast its current demand information by encoding the signal HC # to represent the five-digit value of 10010. For example, the die $100_2$ might cause the signal HC # to have its first logic level during time period t13-t14, to have its second logic level during time periods t14-t15 and t15-t16, to have its first logic level during time period t16-t17, and to have its second logic level during time period t17-t18, thereby representing the digital value 10010.

The die $100_3$ might be designated at time t18, e.g., in response to trace $654_3$ transitioning to the first logic level. The die $100_3$ might then broadcast its current demand information by encoding the signal HC # to represent the five-digit value of 00000. For example, the die $100_3$ might cause the signal HC # to have its second logic level during time periods t19-t20, t20-t21, t21-t22, t22-t23 and t23-t24, thereby representing the digital value 00000.

The die $100_0$ might again be designated at time t24, e.g., in response to trace $654_0$ again transitioning to the first logic level. The die $100_0$ might then broadcast its current demand information by encoding the signal HC # to represent the five-digit value of 11101. For example, the die $100_0$ might cause the signal HC # to have its first logic level during time periods t25-t26, t26-t27 and t27-t28, to have its second logic level during time period t28-t29, and to have its first logic level during time period t29-t30, thereby representing the digital value 11101.

Figure 7A:
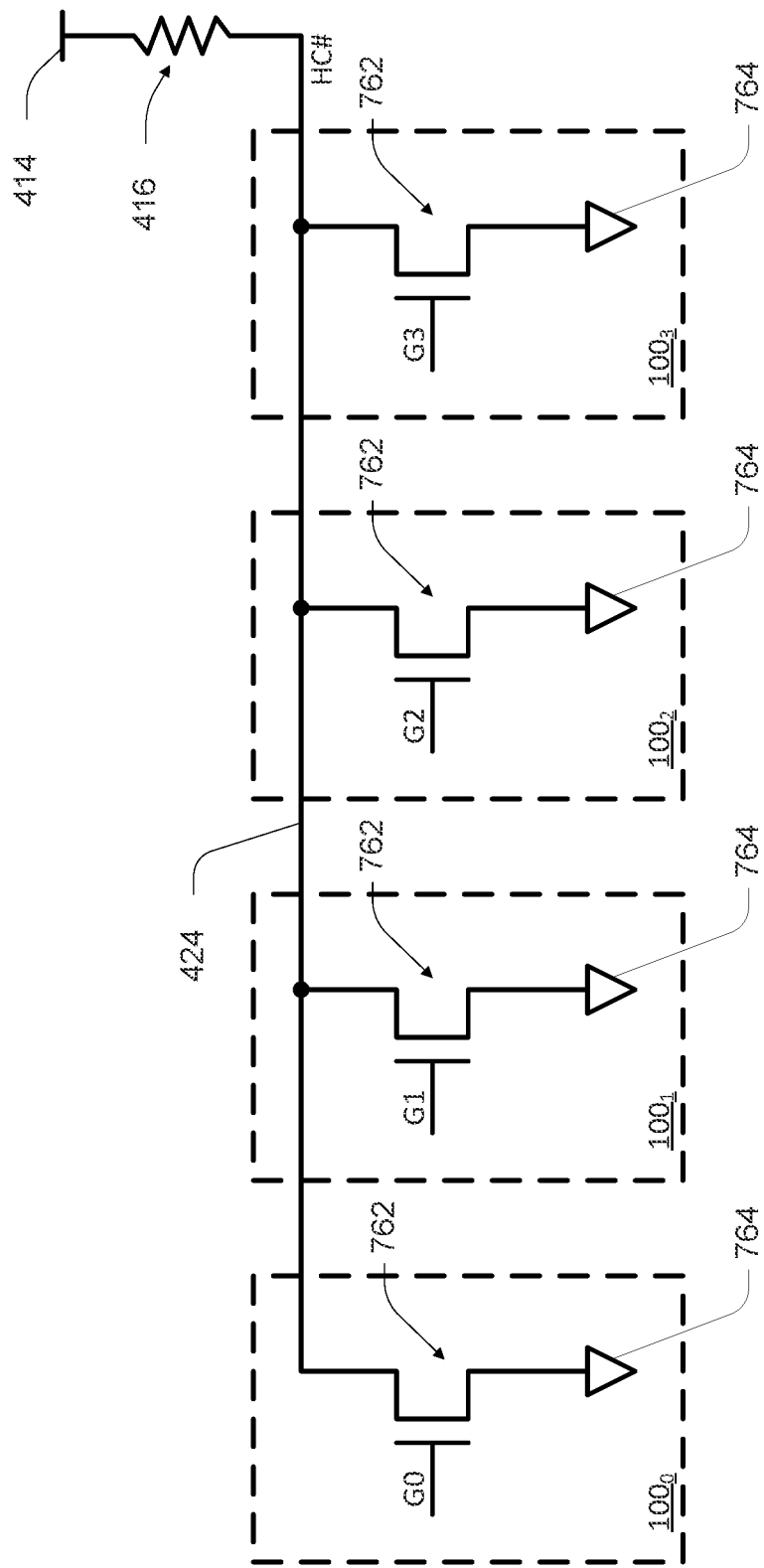
FIGS. 7A-7B are simplified schematics of circuits for generating a signal for use with embodiments.
Figure 7B:
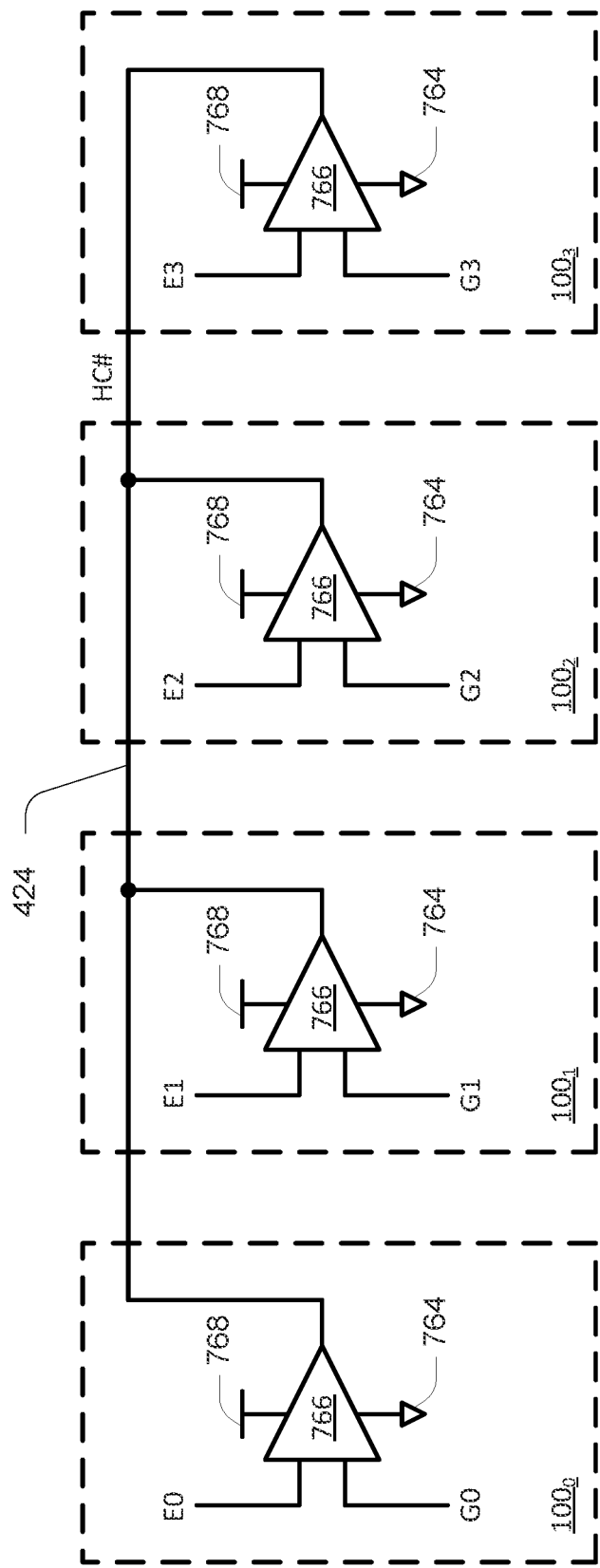

FIGS. 7A-7B are simplified schematics of circuits for generating a signal HC # for use with embodiments. As depicted in FIG. 7A, the dies $100_0$-$100_3$ commonly share the signal HC # via signal line 424. The signal HC # might be normally pulled to a logic high level using voltage supply node 414 and resistor 416, for example. For each of the dies $100_0$-$100_3$, another voltage supply node, such as reference potential node 764 configured to receive a reference potential, such as a ground or Vss, might be selectively connected to the signal line 424 through a switch, e.g., a transistor 762, each having a control gate configured to receive a control signal. For example, die $100_0$ might have the control gate of its transistor 762 configured to receive the control signal G0 generated by the die $100_0$, die $100_1$ might have the control gate of its transistor 762 configured to receive the control signal G1 generated by the die $100_1$, die $100_2$ might have the control gate of its transistor 762 configured to receive the control signal G2 generated by the die $100_2$, and die $100_3$ might have the control gate of its transistor 762 configured to receive the control signal G3 generated by the die $100_3$. These control signals might be generated (e.g., by the controllers of the dies) to activate their respective transistor 762 when their respective die 100 intends to indicate the second logic level, and to deactivate their respective transistor 762 when their respective die 100 intends to indicate the first logic level, or when their respective die 100 is not designated to broadcast its current demand information. In the example of FIG. 7A, when any transistor 762 is activated, the voltage level of the signal line 424 will be pulled to a logic low level, and the voltage level of the signal line 424 will be pulled back to a logic high level when none of the transistors 762 are activated.

As depicted in FIG. 7B, the dies $100_0$-$100_3$ commonly share the signal HC # via signal line 424. The signal HC # might be normally floating unless actively driven by one of the dies $100_0$-$100_3$. Each of the dies $100_0$-$100_3$, might include a driver 766, which might be configured, when enabled, to selectively connect its output to a particular voltage supply node 764 or 768 corresponding to the desired logic level of the signal line 424, or, when disabled, to present a high impedance (high Z) state to the signal line 424 by isolating its output from both voltage supply nodes 764 and 768. For example, die $100_0$ might generate the control signal E1 to have a logic low level to disable its driver 766 and isolate its output from its voltage supply nodes 764 and 768, or to have a logic high level to enable its driver 766 to connect its output to either its voltage supply node 764 or its voltage supply node 768 in response to a logic level of its control signal G0. To continue with this example, if the die $100_0$ generates the control signal G0 to have a logic low level, its driver 766 might be configured to connect its output to its voltage supply node 764, and if the die $100_0$ generates the control signal G0 to have a logic high level, its driver 766 might be configured to connect its output to its voltage supply node 768. Remaining dies $100_1$-$100_3$ might be similarly configured. In this manner, one of the dies 100 could drive the logic level of the signal line 424 with its driver 766 when designated, while the remaining dies 100 might each present a high impedance from their drivers 766. Other circuitry for commonly sharing the signal HC # could also be used where each die 100 is configured to selectively transition a logic level of the signal line 424.

In view of the foregoing example, it will be clear that different orders of digital representations might be represented using fewer or more clock cycles of the clock signal ppmCLK to represent lower or higher degrees of granularity, respectively, of expected peak current magnitudes and/or priority levels. In addition, while the foregoing example completed broadcasting the digital representation for one die before a next die was designated, these two acts could overlap. For example, the counter signal C0 could transition at time t0, and die $100_0$ could broadcast its digital representation from time t1 to time t6 as depicted in FIG. 6. However, in this alternative example, the counter signal C1 could transition at time t5, e.g., while die $100_0$ is broadcasting a last digit of its digital representation, and die $100_1$ could begin broadcasting its digital representation at time t6. Similarly, the counter signal C2 could transition at time t10, e.g., while die $100_1$ is broadcasting a last digit of its digital representation, and die $100_2$ could begin broadcasting its digital representation at time t11, and so on.

Figure 8:
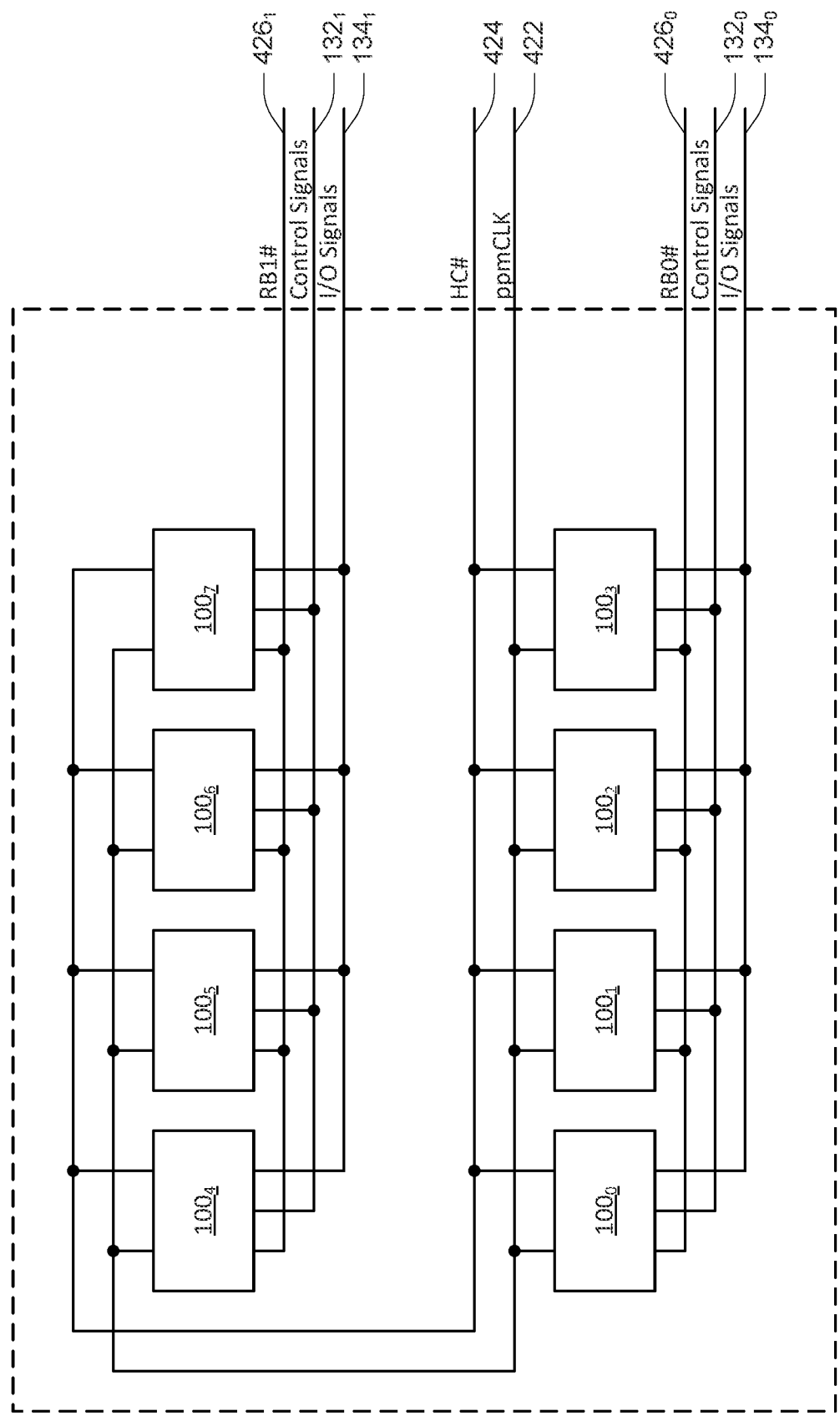
FIG. 8 is a schematic representation of a multi-die package according to another embodiment.

FIG. 8 is a schematic representation of a multi-die package including eight dies 100 (e.g., $100_0$-$100_7$) according to another embodiment. The clock signal ppmCLK is commonly shared between the dies 100 through a clock signal line 422. Dies $100_0$-$100_7$ might be part of a multi-die package 302. Dies $100_0$-$100_3$ might be selectively enabled in response to a chip enable signal CE0 # (not separately depicted) as part of control link $132_0$, and might communicate over I/O bus $134_0$. Dies $100_4$-$100_7$ might be selectively enabled in response to a chip enable signal CE1 # (not separately depicted) as part of control link $132_1$ that is separate from the control link $132_0$, and might communicate over I/O bus $134_1$ that is separate from the I/O bus $134_0$.

The signal HC # is commonly shared between the dies 100 through a signal line 424. The signal HC # might be normally pulled to a particular state (e.g., pulled high). The ready/busy control signal RB0 # is commonly shared between the dies $100_0$-$100_3$ through a control signal line $426_0$. The ready/busy control signal RB1 # is commonly shared between the dies $100_4$-$100_7$ through a control signal line $426_1$. The ready/busy control signals RB0 # and RB1 # might both be normally pulled to a particular state (e.g., pulled high) independently of one another. For such an example, embodiments might cycle through each of the dies 100 for determining and broadcasting expected peak current magnitude, even though some of the dies 100 might be disabled in response to their respective chip enable signal. For embodiments sharing the signal HC # in a manner such as described with reference to FIG. 7A, the encoded value for the lowest expected peak current magnitude might be configured such that each of its digits correspond to the normal logic level of the signal HC # where the disabled dies 100 do not transition the signal HC #. Alternatively, for embodiments sharing the signal HC # in a manner such as described with reference to FIG. 7B, the dies 100 might be configured, when otherwise disabled in response to their respective chip enable signal, to drive transitions of the signal HC # to indicate the encoded value for the lowest expected peak current magnitude upon being designated.

Figure 9:
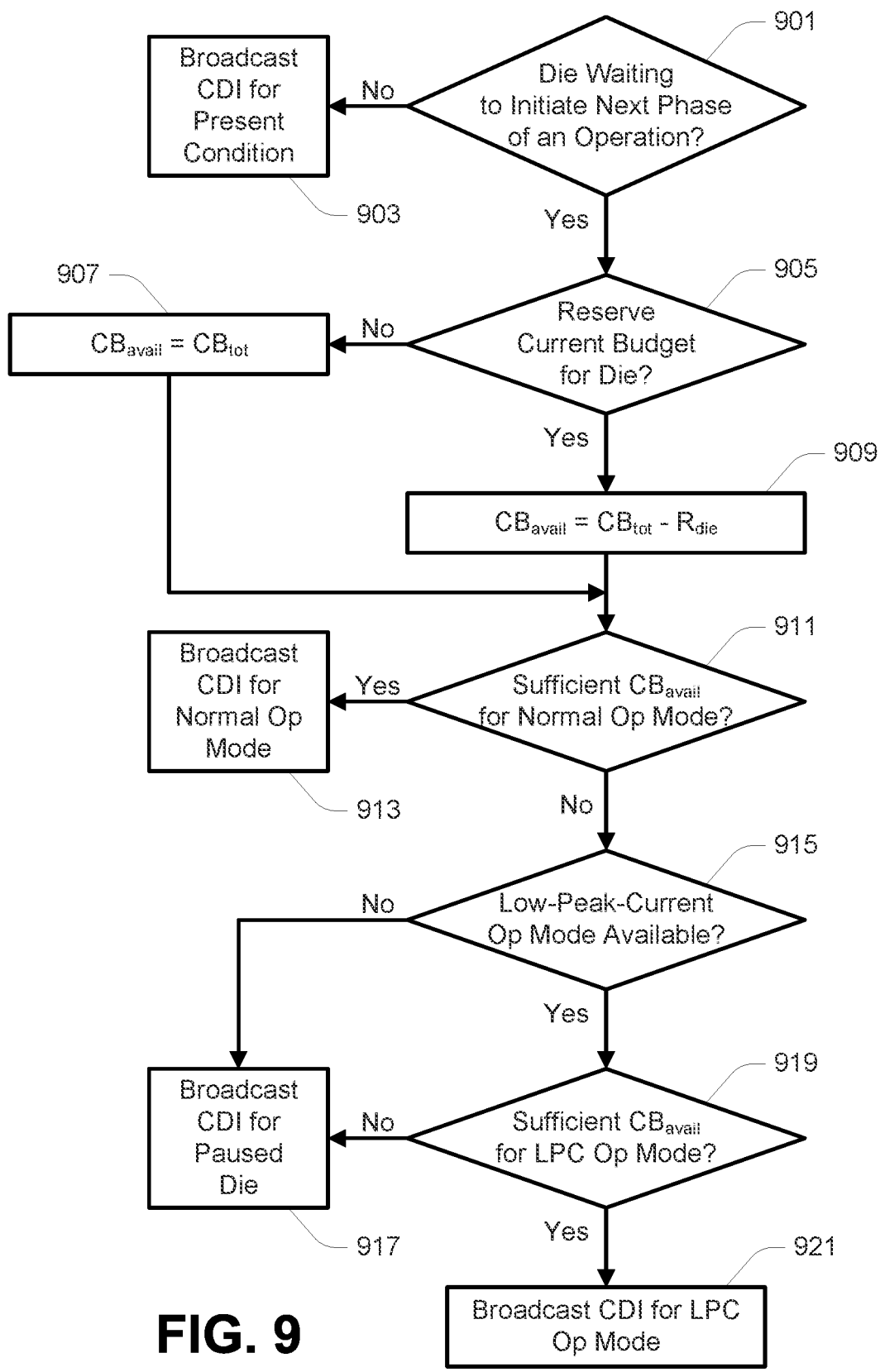
FIG. 9 is a flowchart of a method of operating a die in accordance with an embodiment.

FIG. 9 depicts a flowchart of a method of operating a die, e.g., a memory device or other integrated circuit device, in accordance with an embodiment. The method might be in the form of computer-readable instructions, e.g., stored to the instruction registers 128. Such computer-readable instructions might be executed by a controller, e.g., the control logic 116, to cause the die (e.g., relevant components of the die) to perform the method.

At 901, a determination might be made whether the die is waiting to initiate a next phase of an access operation, which might be an initial phase of an access operation. For example, a determination might be made whether a die has completed a prior phase of the access operation and is paused, or whether the die has completed a prior access operation and has a subsequent access operation queued. In response to determining that the die is not waiting to initiate a next phase of an access operation, the die might proceed to 903 and broadcast the current demand information for its present condition. The present condition of the die might be idle, even if it has received a command to perform the next access operation, and the die might further continue in an idle state. Alternatively, the present condition of the die might be actively performing a phase of the access operation, and the die might continue to perform that phase of the access operation. For some embodiments, the current demand information might comprise, and might further consist of, an indicator of an expected peak current magnitude. For other embodiments, the current demand information might comprise an indicator of an expected peak current magnitude and a priority token.

In response to determining that the die is waiting to initiate a next phase of an access operation, e.g., having completed a prior phase of the access operation or having completed a prior access operation, it might proceed to 905 and determine whether a current budget reserve corresponds to the die. In response to determining that there is no corresponding current budget reserve for the die, it might be determined at 907 that an available current budget $C_{avail}$ is equal to a total current budget $C_{tot}$ for a multi-die packaging containing the die. In response to determining that there is a corresponding current budget reserve for the die, it might be determined at 909 that the available current budget $C_{avail}$ is equal to the total current budget $C_{tot}$ minus the current budget reserve $R_{die}$ corresponding to the die. Note that determining the available current budget $C_{avail}$ to be equal to the total current budget $C_{tot}$ at 907 can be equivalent to determining that the available current budget $C_{avail}$ is equal to the total current budget $C_{tot}$ minus the current budget reserve Rate corresponding to the die at 909, when the current budget reserve $R_{die}$ corresponding to the die equals zero. The process might then proceed to 911.

At 911, the die might determine if there is sufficient available current budget to initiate the next phase of the access operation for the die in a normal operating mode for that phase of the access operation. In response to determining that there is sufficient available current budget to proceed in the normal operating mode, the die, at 913, might broadcast the current demand information for the normal operating mode of that phase of its access operation. The die might further initiate the next phase of the access operation in the normal operating mode. In response to determining that there is not sufficient available current budget to proceed in the normal operating mode, the die might proceed to 915.

At 915, the die might determine if a low-peak-current operating mode is available to perform the next phase of the access operation. In response to determining that there is no such low-peak-current operating mode, the die might proceed to 917 and broadcast the current demand information for a paused die, which might be the same as the current demand information for an idle die. The die might further pause its operation waiting for sufficient available current budget, e.g., delay initiating the next phase of the access operation. In response to determining that a low-peak-current operating mode is available, the die might proceed to 919.

At 919, the die might determine if there is sufficient available current budget to initiate the next phase of the access operation for the die in the low-peak-current operating mode for that phase of the access operation. In response to determining that there is not sufficient available current budget to proceed in the low-peak-current operating mode, the die might proceed to 917 and broadcast the current demand information for a paused die, and might further pause its operation waiting for sufficient available current budget. In response to determining that there is sufficient available current budget to proceed in the low-peak-current operating mode, the die might proceed to 921 and might broadcast the current demand information for the low-peak-current operating mode of that phase of its access operation. The die might further initiate the next phase of the access operation in the low-peak-current operating mode.

The process of FIG. 9 might be repeated for each die of a multi-die package in a sequence, while the dies are enabled, e.g., by their chip enable signal. For some embodiments, the process of FIG. 9 might be repeated for the enabled dies in response to at least one of the dies of the multi-die package indicating that it is busy, e.g., as indicated by their shared ready/busy control signal.

Figure 10A:
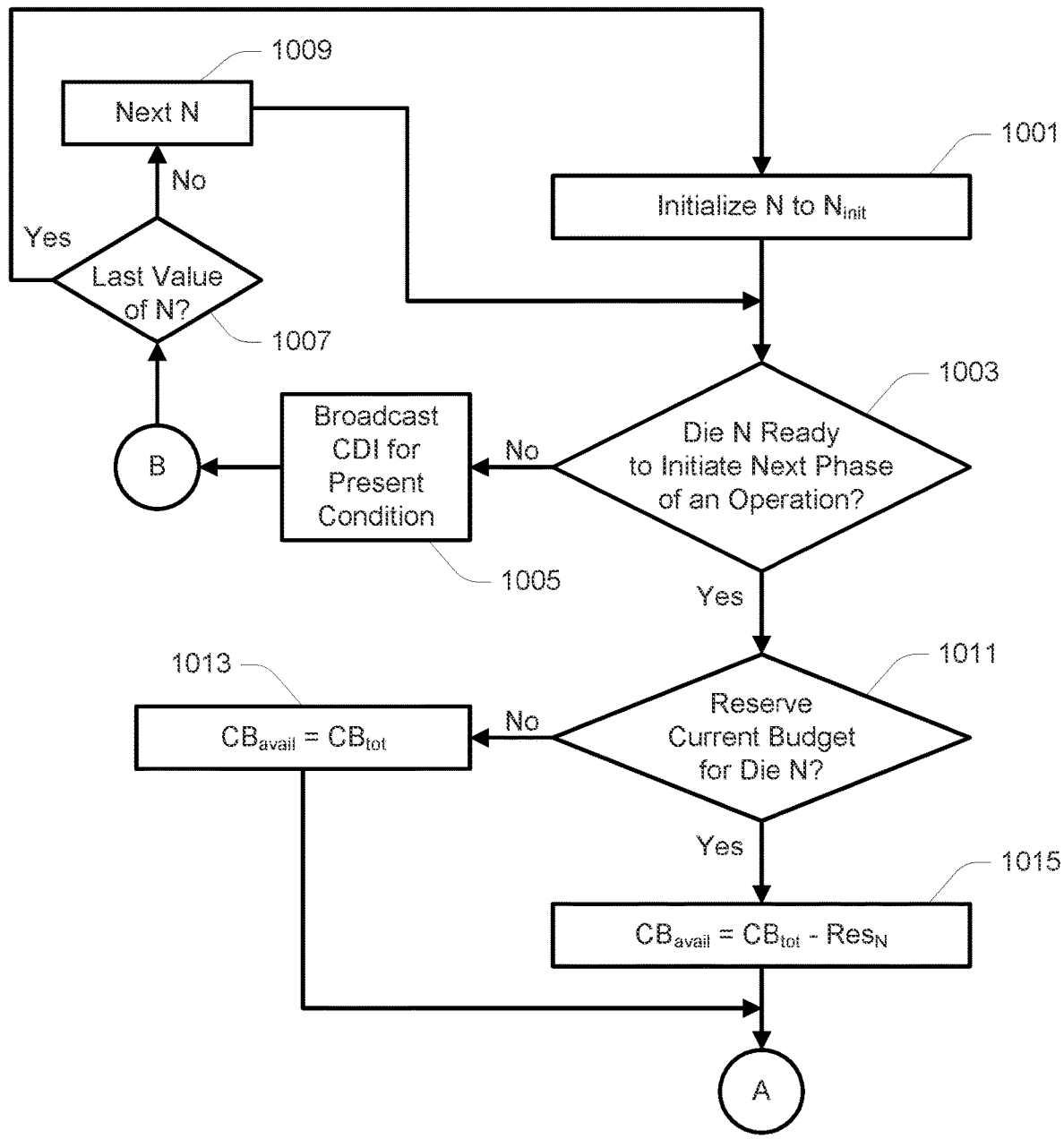
FIGS. 10A-10B are flowcharts of a method of operating a plurality of dies in accordance with embodiments.
Figure 10B:
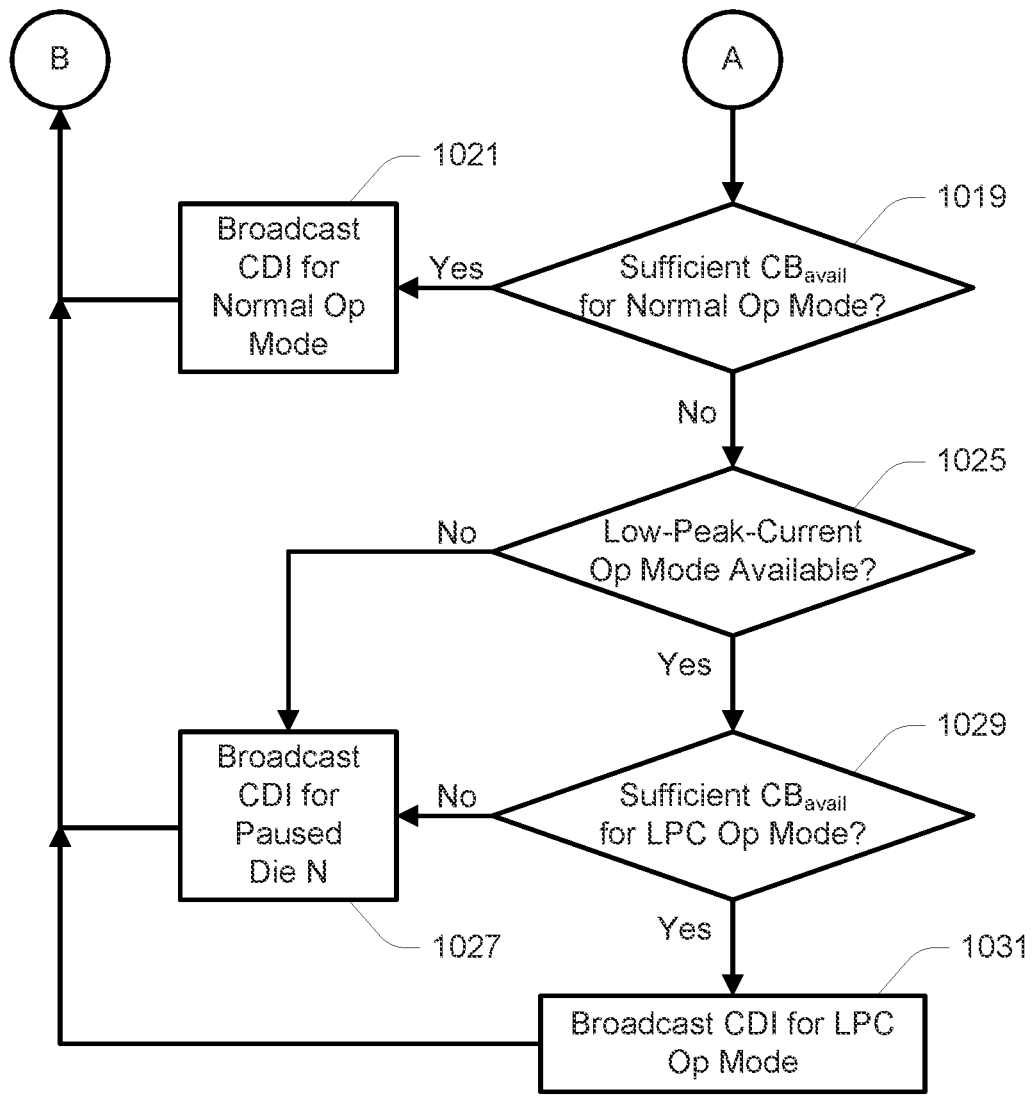

FIGS. 10A-10B depict flowcharts of a method of operating a plurality of dies, e.g., memory devices or other integrated circuit devices, in accordance with an embodiment. The method might be in the form of computer-readable instructions, e.g., stored to the instruction registers 128. Such computer-readable instructions might be executed by controllers, e.g., the control logic 116, to cause the dies (e.g., relevant components of the dies) to perform the method.

At 1001, a variable N might be initialized to a value $N_{init}$. The value of the variable N might represent an integer value of a counter, e.g., a wrap-around counter, for counting a representative value for each die of a plurality of dies of a multi-die package. For example, for an embodiment with D dies, the value of N might be initialized at $N_{init}$, and might count to a value of $D+N_{init}-1$. For example, where D=4, and $N_{init}=0$, the counter might be advanced, e.g., incremented, from 0 to 3 before re-initializing to 0. Alternatively, if $N_{init}=1$ for this example, the counter might be advanced from 1 to 4 before re-initializing to 1. For other embodiments, the variable N might represent a corresponding digit pattern of D digit patterns, e.g., a digit pattern of the four control signals C0, C1, C2 and C3 as described with reference to FIG. 6. As such, the cycling of the variable N through D unique values depicted in FIG. 10A might represent a cycle of digit patterns 1000, 0100, 0010 and 0001 as described with reference to FIG. 6. Furthermore, although the embodiment of FIGS. 10A-10B is discussed with reference to an incremental sequence, a sequence of the values of N could instead be decremented with intuitively obvious changes in the disclosed process, e.g., the value of N might be initialized at $N_{init}$, and might count to a value of $N_{init}+1-D$ before being re-initialized. For example, where D=4, and $N_{init}=3$, the counter might be advanced, e.g., decremented, from 3 to 0 before re-initializing to 3. Other sequencing schemes could be utilized having a sequence of D unique values, with each of D dies broadcasting current demand information on a shared signal in response to a value of N corresponding to a respective one of the D unique values.

At 1003, a determination might be made whether a die corresponding to the present value of N, e.g., Die N, is waiting to initiate a next phase of an access operation, which might be an initial phase of an access operation that it is waiting to perform, or a next phase of an access operation that it is presently performing. In response to determining that Die N is not waiting to initiate the next phase of its access operation, the process might proceed to 1005 and broadcast the current demand information for the present condition of Die N. The present condition of Die N might be idle, and Die N might further continue in an idle state. Alternatively, the present condition of Die N might be actively performing a phase of an access operation, and Die N might continue to perform that phase of the access operation. For some embodiments, the current demand information might comprise, and might consist of, an indicator of an expected peak current magnitude. For other embodiments, the current demand information might comprise an indicator of an expected peak current magnitude and a priority token.

In response to determining that Die N is waiting to initiate a next phase of an access operation, e.g., having completed a prior phase of the access operation or having completed a prior access operation, it might proceed to 1011 and determine whether a current budget reserve corresponds to Die N. In response to determining that there is no corresponding current budget reserve for Die N, it might be determined at 1013 that an available current budget $C_{avail}$ is equal to a total current budget $C_{tot}$. In response to determining that there is a corresponding current budget reserve for Die N, it might be determined at 1015 that the available current budget $C_{avail}$ is equal to the total current budget $C_{tot}$ minus the current budget reserve $Res_N$ corresponding to Die N. The process might then proceed to point A, and thus to 1019 of FIG. 10B.

At 1019, Die N might determine if there is sufficient available current budget to initiate the next phase of the access operation for Die N in a normal operating mode for that phase of the access operation. In response to determining that there is sufficient available current budget to proceed in the normal operating mode, Die N, at 1021, might broadcast the current demand information for the normal operating mode of that phase of its access operation. In response to determining that there is not sufficient available current budget to proceed in the normal operating mode, Die N might proceed to 1025.

At 1025, Die N might determine if a low-peak-current operating mode is available to perform the next phase of the access operation. In response to determining that there is no such low-peak-current operating mode, Die N might proceed to 1027 and broadcast the current demand information for a paused Die N, and might further pause its operation waiting for sufficient available current budget. In response to determining that a low-peak-current operating mode is available, Die N might proceed to 1029.

At 1029, Die N might determine if there is sufficient available current budget to initiate the next phase of the access operation for Die N in the low-peak-current operating mode for that phase of the access operation. In response to determining that there is not sufficient available current budget to proceed in the low-peak-current operating mode, Die N might proceed to 1027 and broadcast the current demand information for a paused Die N, and might further pause its operation waiting for sufficient available current budget. In response to determining that there is sufficient available current budget to proceed in the low-peak-current operating mode, Die N might proceed to 1031 and might broadcast the current demand information for the low-peak-current operating mode of that phase of its access operation.

Upon broadcasting current demand information, whether at 1005 of FIG. 10A or at 1021, 1027 or 1031 of FIG. 10B, the process might proceed to point B, whether concurrent with, or subsequent to, the broadcasting of the current demand information. From point B, the process might proceed to 1007 and determine whether the value of N is the last value, e.g., of a sequence. In response to determining that the value of N is not the last value of the sequence, the value of N might be advanced at 1009, e.g., incremented for an incremental counter, decremented for a decremental counter, changed to the next digit pattern of a sequence of a plurality of digit patterns, etc. From 1009, the process might return to 1003. In response to determining that the value of N is the last value of the sequence at 1007, the process might return to 1001 to initialize, e.g., re-initialize, the value of N before proceeding to 1003.

The process of FIGS. 10A-10B might be repeated while the D dies are enabled, e.g., by their chip enable signal. For some embodiments, the process of FIGS. 10A-10B might be repeated for the enabled dies in response to at least one of the dies indicating that it is busy, e.g., as indicated by their shared ready/busy control signal.

Figure 11A:
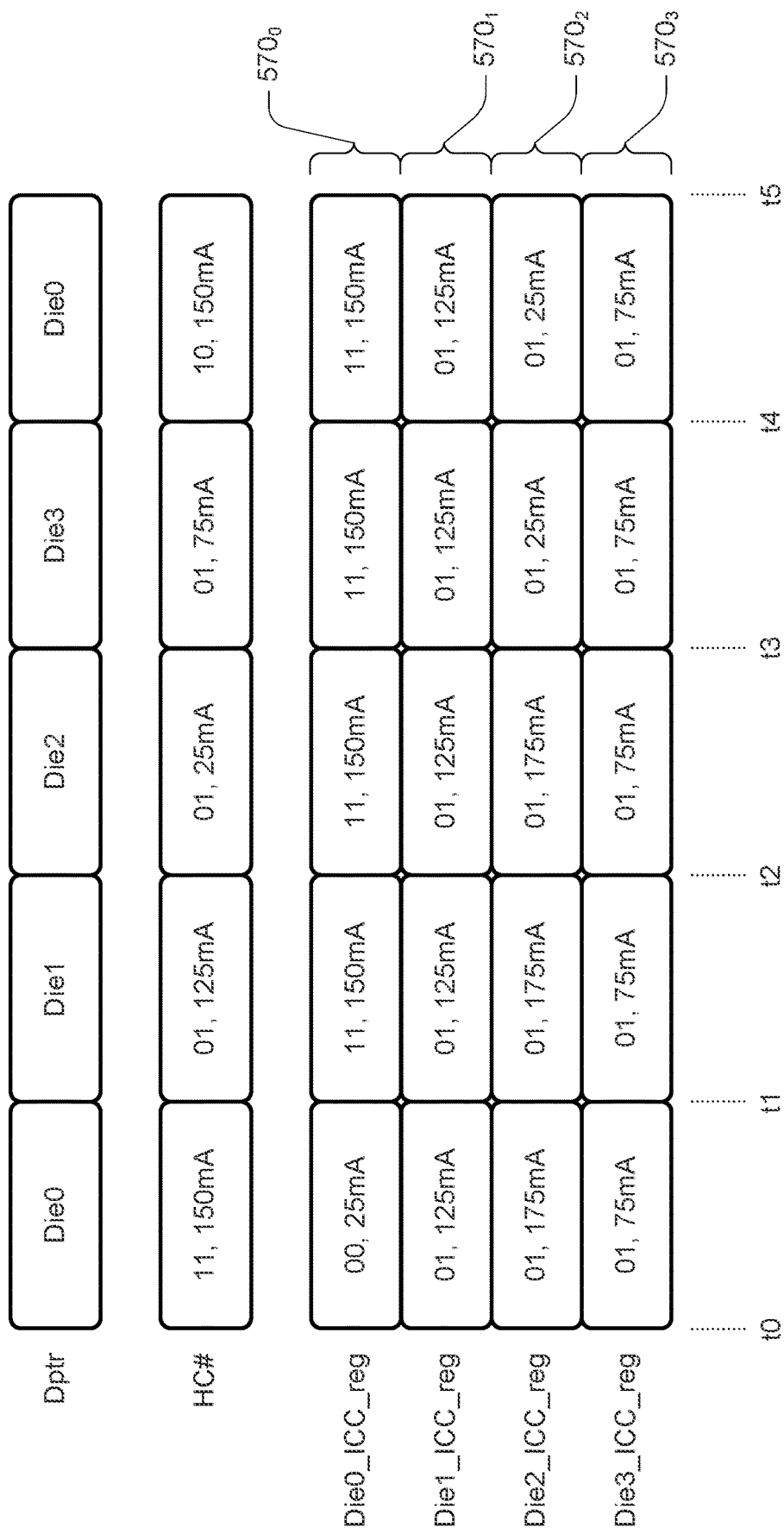
FIGS. 11A-11B are conceptual timing diagrams of signals and register contents in accordance with embodiments.

FIG. 11A is a conceptual timing diagram of signals and register contents implementing a defined budget release by priority level. The embodiment of FIG. 11A might again use four priority tokens, e.g., 11, 10, 01 and 00, where each priority token is an indication of a priority level. The priority token 11 might indicate a highest priority level corresponding to a die that is deemed to have been waiting to initiate a next or initial phase of an access operation for more than a desired period of time, e.g., a timeout period, or corresponding to a die that is waiting to initiate an initial phase of an access operation deemed to be of high priority. The priority token 10 might indicate a die performing a high-priority access operation. Such dies might enter a low-peak-current operating mode or pause their operation in response to determining that there is insufficient available current budget, and may further enter a low-peak-current operating mode to satisfy the current budget requested by a die having the priority token 11, but might not pause their operation to satisfy the current budget requested by a die having the priority token 11. The priority token 01 might represent a lesser priority level than the priority token 10. Dies with this priority token might enter a low-peak-current operating mode or pause their operation in response to determining that there is insufficient available current budget, and might further enter a low-peak-current operating mode or pause their operation to satisfy the current budget requested by a die having the priority token 11. The priority token 00 might indicate an idle die, e.g., paused and waiting to initiate a next phase of an access operation, or suspended with no queued command to perform an access operation, thus effectively having a lowest priority.

In the example of FIG. 11A the current budget, e.g., total current budget, might be 400 mA to be shared by four dies 100, e.g., Die0 $100_0$, Die1 $100_1$, Die2 $100_2$, and Die3 $100_3$ of FIG. 4. Each die 100 might have four registers 570, e.g., Die0_ICC_reg $570_0$, Die1_ICC_reg $570_1$, Die2_ICC_reg $570_2$, and Die3_ICC_reg $570_3$, for storing information, e.g., current demand information, regarding respective expected peak current magnitudes and respective priority tokens for each of the dies 100. The die pointer Dptr might represent an indication of when each die 100 is to broadcast its expected peak current magnitude and its priority token using the signal HC #, such as described with reference to FIG. 6.

Prior to time t0 of FIG. 11A, Die0 might be idle, e.g., having a priority token of 00 and having an expected peak current magnitude of 25 mA, e.g., less than or equal to 25 mA. Die1 might have a priority token of 01 and might be performing a phase of an access operation, e.g., having an expected peak current magnitude of 125 mA, e.g., less than or equal to 125 mA. Die2 might have a priority token of 01 and might be performing a phase of an access operation, e.g., having an expected peak current magnitude of 175 mA, e.g., less than or equal to 175 mA. Die3 might have a priority token of 01 and might be performing a phase of an access operation, e.g., having an expected peak current magnitude of 75 mA, e.g., less than or equal to 75 mA. Die1, Die2 and Die3 might be performing different access operations, or might be performing the same access operation, but at different phases of that access operation.

Further prior to time t0 of FIG. 11A, Die0 might receive a command to initiate an access operation, and might be assigned a priority token of 11 for that access operation. The assignment of the priority token might be made by a host 240 in communication with Die0, e.g., by an application running on the host 240 and seeking to perform the access operation. Alternatively, the assignment of the priority token might be predetermined by the type of access operation to be performed. For example, a host 240 might deem the access operation to be of higher priority than the access operations being performed by the dies Die1, Die2 and Die3. The initial phase of the access operation for Die0 might have an expected peak current magnitude of 150 mA in a normal operating mode, and might not have a low-peak-current operating mode. With a current budget, e.g., total current budget, of 400 mA, and with Die1, Die2 and Die3 having expected peak current magnitudes of 125 mA, 175 mA and 75 mA, respectively, Die0 would thus determine that it could not initiate its access operation. As such, its expected peak current magnitude would be expected to remain at the level of an idle die, e.g., 25 mA. However, Die0 might broadcast its current demand information between times t0 and t1 as an expected peak current magnitude of 150 mA, e.g., the expected peak current magnitude if it were to initiate the next phase of its access operation, and its updated priority token of 11. Each of the dies might then update their register $570_0$ accordingly. Having the priority token of 11, the expected peak current magnitude of Die0 might represent a requested peak current magnitude as Die0 has determined that it cannot initiate the next phase of its access operation. As such, it might not be utilized in calculations of total current demand in all cases.

Prior to time t1 of FIG. 11A, Die1 might determine that it is still performing its phase of its access operation, such that no decision to proceed is relevant. As such, its expected peak current magnitude would be expected to remain at 125 mA, and Die1 might broadcast its current demand information between times t1 and t2 as an expected peak current magnitude of 125 mA and its priority token of 01. Each of the dies might then update their register $570_1$ accordingly. As used herein, updating a register 570 might include making no change to that register 570 where the new current demand information is the same as the prior current demand information.

Prior to time t2 of FIG. 11A, Die2 might complete its phase of its access operation and might determine that a subsequent phase of its access operation, which might include an initial phase of a subsequent access operation, has an expected peak current magnitude of 175 mA in a normal operating mode, and an expected peak current magnitude of 75 mA in a low-peak-current operating mode. Having the priority token of 01, Die2 might determine whether any of the other dies has the highest priority token of 11. Because Die0 has the priority token 11, Die2 might use the expected peak current magnitudes stored in its registers 570 to determine whether it can proceed in its normal operating mode. However, 150 mA+125 mA+175 mA+75 mA equals 525 mA, which exceeds the total current budget of 400 mA. As such, Die2 might determine that it could not proceed in its normal operating mode. Die2 might then use the expected peak current magnitudes stored in its registers 570 to determine whether it can proceed in its low-peak-current operating mode. However, 150 mA+125 mA+75 mA+75 mA equals 425 mA, which again exceeds the total current budget of 400 mA. As such, Die2 might determine that it could not proceed in its low-peak-current operating mode, such that it might continue to wait to initiate the next phase of its access operation. As such, its expected peak current magnitude would be expected to reduce to 25 mA, and Die2 might broadcast its current demand information between times t2 and t3 as an expected peak current magnitude of 25 mA and its priority token of 01. Each of the dies might then update their register $570_2$ accordingly.

Prior to time t3 of FIG. 11A, Die3 might complete its phase of its access operation and might determine that a subsequent phase of its access operation has an expected peak current magnitude of 75 mA in a normal operating mode, and that no low-peak-current operating mode is available. Having the priority token of 01, Die3 might determine whether any of the other dies has the highest priority token of 11. Because Die0 has the priority token 11, Die3 might use the expected peak current magnitudes stored in its registers 570 to determine whether it can proceed in its normal operating mode. In this case, 150 mA+125 mA+25 mA+75 mA equals 375 mA, such that there is sufficient available current budget to proceed in its normal operating mode. Die3 might broadcast its current demand information between times t3 and t4 as an expected peak current magnitude of 75 mA and its priority token of 01. Each of the dies might then update their register $570_3$ accordingly.

Prior to time t4 of FIG. 11A, Die0 might use the expected peak current magnitudes stored in its registers 570 to determine whether it can proceed in its normal operating mode. In this case, 150 mA+125 mA+25 mA+75 mA equals 375 mA, such that there is sufficient available current budget to proceed in its normal operating mode. With sufficient available current budget, Die0 might change its priority token to 10 to indicate that it is deemed to be performing its access operation, and might broadcast its current demand information between times t4 and t5 as an expected peak current magnitude of 150 mA and its priority token of 10. Each of the dies might then update their register $570_0$ accordingly.

Figure 11B:
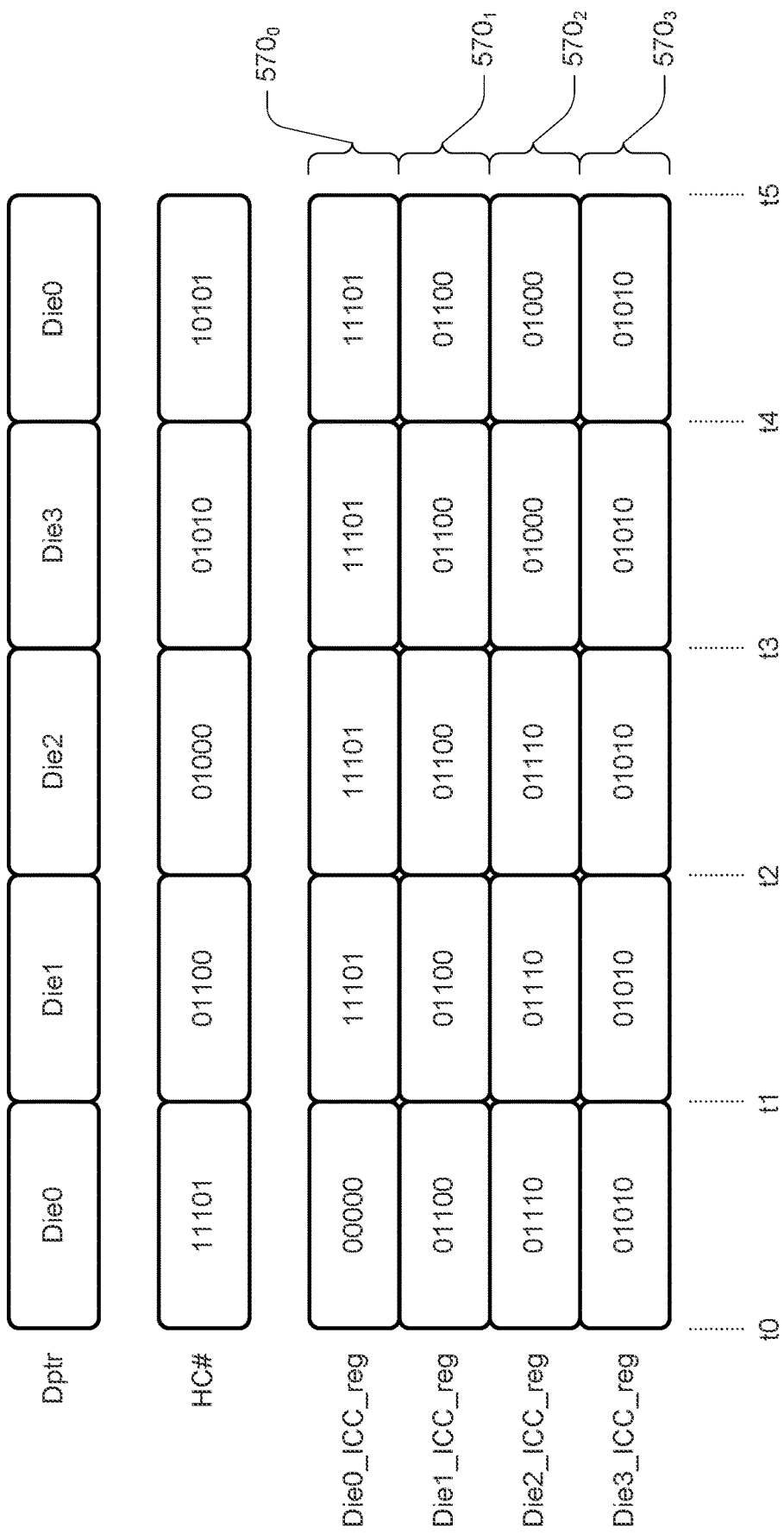

FIG. 11B is a conceptual timing diagram of signals and register contents for an embodiment such as described with reference to FIG. 11A and using the encoded values of Table 1 for communicating and storing the values of the priority tokens and expected peak current magnitudes. In the example of FIG. 11B, the first two digits of the five-digit values of the signal HC # and of the contents of the registers 570 might represent the priority token, while the last three digits of the five-digit values of the signal HC # and of the contents of the registers 570 might represent the expected peak current magnitudes.

Figure 12A:
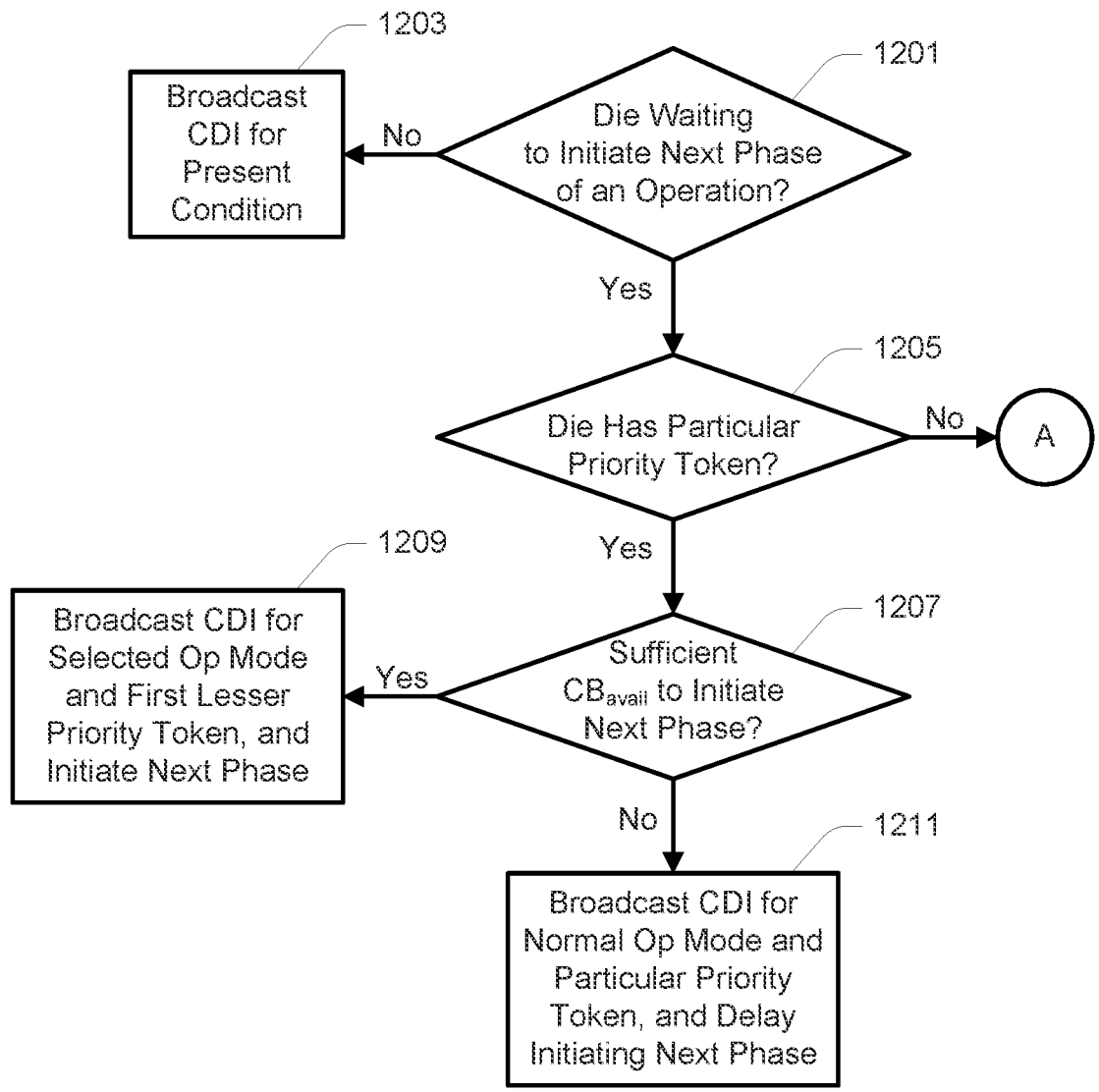
FIGS. 12A-12C are flowcharts of a method of operating a die in accordance with an embodiment.
Figure 12B:
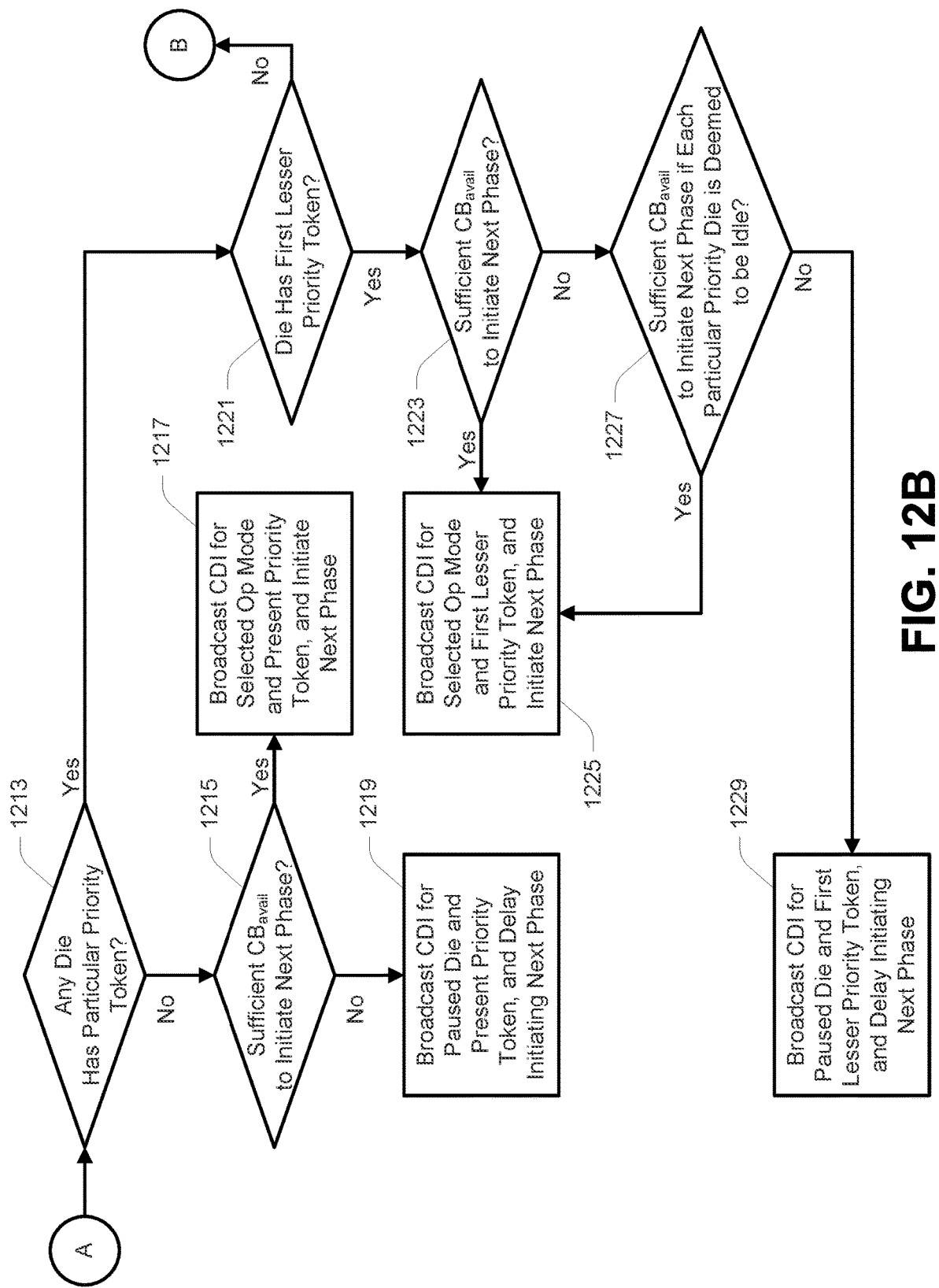
Figure 12C:
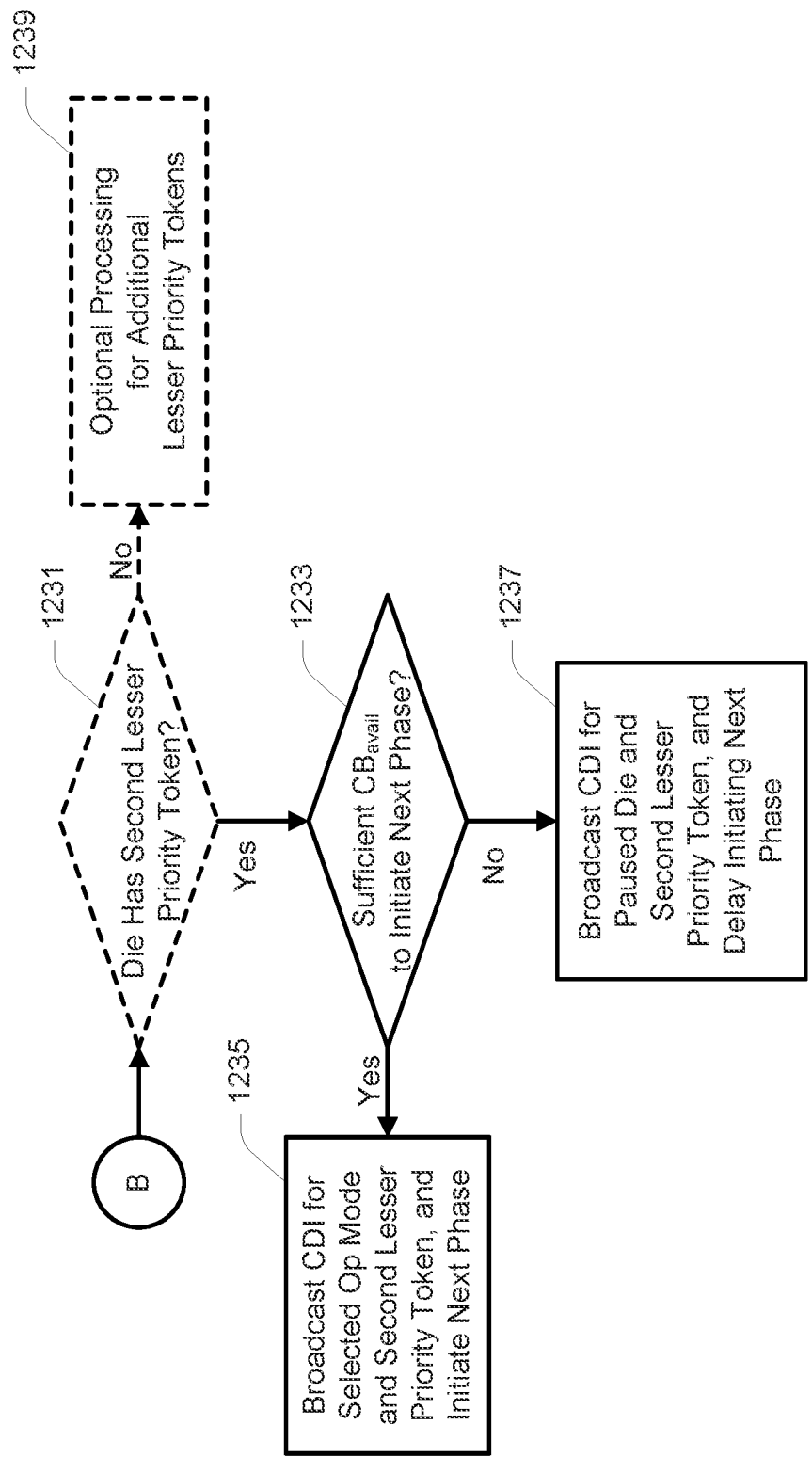

FIGS. 12A-12C are flowcharts of a method of operating a die, e.g., a memory device or other integrated circuit device, in accordance with an embodiment. The method might be in the form of computer-readable instructions, e.g., stored to the instruction registers 128. Such computer-readable instructions might be executed by a controller, e.g., the control logic 116, to cause the die (e.g., relevant components of the die) to perform the method.

At 1201, a determination might be made whether the die is waiting to initiate a next phase of an access operation, which might be an initial phase of an access operation. For example, a determination might be made whether a die has completed a prior phase of the access operation and is paused, or whether the die has completed a prior access operation and has a subsequent access operation queued. In response to determining that the die is not waiting to initiate a next phase of an access operation, the die might proceed to 1203 and broadcast the current demand information for its present condition. The present condition of the die might be idle, even if it has received a command to perform the next access operation, and the die might further continue in an idle state. Alternatively, the present condition of the die might be actively performing a phase of the access operation, and the die might continue to perform that phase of the access operation. For some embodiments, the current demand information might comprise an indicator of an expected peak current magnitude and a priority token.

In response to determining that the die is waiting to initiate a next phase of an access operation, e.g., having completed a prior phase of the access operation or having completed a prior access operation, the die might proceed to 1205 and determine if the die has a particular priority token. The particular priority token might correspond to a highest priority level of a plurality of priority levels assignable to the die. However, the particular priority token could correspond to a priority level other than the highest priority level of the plurality of priority levels. The method of FIGS. 12A-12C directly address up to three different priority tokens, and thus three different priority levels, but actions taken in response to other priority tokens could be added.

In response to determining that the die does not have the particular priority token at 1205, the process might then proceed to point A, and thus to 1213 of FIG. 12B. In response to determining that the die does have the particular priority token at 1205, the process might then proceed to 1207 and the die might determine if there is sufficient available current budget to initiate the next phase of the access operation for the die for a selected operating mode of one or more operating modes of the die for the next phase of the access operation. In response to determining that there is sufficient available current budget to proceed, the die, at 1209, might broadcast the current demand information for a selected operating mode of that phase of its access operation. The die might further change its priority token to a first lesser priority token, e.g., corresponding to a lower priority level of the plurality of priority levels than the particular priority token, and broadcast the first lesser priority token in its current demand information. The die might further initiate the next phase of the access operation in the selected operating mode. The selected operating mode might be a normal operating mode regardless of whether a low-peak-current operating mode is available. Alternatively, the selected operating mode might be the normal operating mode in response to determining that there is sufficient available current budget to initiate the next phase in the normal operating mode, and might be the low-peak-current operating mode in response to determining that there is insufficient available current budget to initiate the next phase in the normal operating mode, but sufficient available current budget to initiate the next phase in the low-peak-current operating mode.

In response to determining that there is not sufficient available current budget to proceed in the selected operating mode at 1207, the die might proceed to 1211. At 1211, the die might broadcast the current demand information for the die if it were to initiate the next phase of its access operation in the normal operating mode, along with the particular priority token, but the die might delay initiating the next phase of its access operation. In effect, the die would indicate that it still has the particular priority token, and will have an expected peak current magnitude as if it were operating in its normal operating mode. However, the die might instead only have the expected peak current magnitude of an idle die because it is still waiting to initiate the next phase of its access operation.

At 1213 in FIG. 12B, the die, having determined that it did not have the particular priority token, might determine whether any die of the plurality of dies of the multi-die package has the particular priority token. In response to determining that no die has the particular priority token at 1213, the process might then proceed to 1215 and the die might determine if there is sufficient available current budget to initiate the next phase of the access operation for the die for a selected operating mode of the one or more operating modes of the die for the next phase of the access operation.

In response to determining that there is sufficient available current budget to proceed, the die, at 1217, might broadcast the current demand information for a selected operating mode of that phase of its access operation, and its present priority token. The die might further initiate the next phase of the access operation in the selected operating mode. The selected operating mode might be a normal operating mode regardless of whether a low-peak-current operating mode is available. Alternatively, the selected operating mode might be the normal operating mode in response to determining that there is sufficient available current budget to initiate the next phase in the normal operating mode, and might be the low-peak-current operating mode in response to determining that there is insufficient available current budget to initiate the next phase in the normal operating mode, but sufficient available current budget to initiate the next phase in the low-peak-current operating mode.

In response to determining that there is not sufficient available current budget to proceed in the selected operating mode at 1215, the die might proceed to 1219. At 1219, the die might broadcast the current demand information for a paused die, along with its present priority token. The die might further delay initiating the next phase of its access operation.

In response to determining that at least one die of the plurality of dies has the particular priority token at 1213, the process might then proceed to 1221 and the die might determine if it has the first lesser priority token. In response to determining that the die does not have the first lesser priority token at 1221, the process might then proceed to point B, and thus to 1231 and/or 1233 of FIG. 12C. In response to determining that the die does have the first lesser priority token at 1221, the process might then proceed to 1223 and the die might determine if there is sufficient available current budget to initiate the next phase of the access operation for the die for a selected operating mode of one or more operating modes of the die for the next phase of the access operation. In response to determining that there is sufficient available current budget to proceed, the die, at 1225, might broadcast the current demand information for the selected operating mode of that phase of its access operation, along with the first lesser priority token. The die might further initiate the next phase of the access operation in the selected operating mode. The selected operating mode might be a normal operating mode regardless of whether a low-peak-current operating mode is available. Alternatively, the selected operating mode might be the normal operating mode in response to determining that there is sufficient available current budget to initiate the next phase in the normal operating mode, and might be the low-peak-current operating mode in response to determining that there is insufficient available current budget to initiate the next phase in the normal operating mode, but sufficient available current budget to initiate the next phase in the low-peak-current operating mode.

In response to determining that there is not sufficient available current budget to proceed in the selected operating mode at 1223, the die might proceed to 1227. At 1227, the die might determine if there is sufficient available current budget to initiate the next phase of the access operation for the die for a selected operating mode of one or more operating modes of the die for the next phase of the access operation if each die having the particular priority token is deemed to be idle. For example, instead of using the expected peak current magnitude broadcast by a die having the particular priority token when determining if there is sufficient available current budget at 1223, the die might instead use the expected peak current budget of an idle die in making the determination at 1227. In response to determining that there is sufficient available current budget to proceed, the die might return to 1225 to broadcast its current demand information and priority token, and initiate the next phase of its access operation.

In response to determining that there is not sufficient available current budget to proceed in the selected operating mode at 1227, the die might proceed to 1229. At 1229, the die might broadcast the current demand information for a paused die, along with its present priority token, i.e., the first lesser priority token. The die might further delay initiating the next phase of its access operation.

The die, having determined that it did not have the first lesser priority token at 1221 and proceeded to point B, might optionally proceed to 1231 and might determine whether it has a second lesser priority token. The second lesser priority token might correspond to a priority level of the plurality of priority levels that is lower than the priority level corresponding to the first lesser priority token. For the example discussed with reference to FIGS. 11A-11B, there were four priority tokens, with 11 corresponding to the highest priority level, 10 corresponding to a next lower priority level, 01 corresponding to a next lower priority level, and 00 corresponding to an idle die. In this scheme, 11 might be the particular priority token, 10 might be the first lesser priority token, and 01 might be the second lesser priority token. In such a scheme, if the die were waiting to initiate the next phase of its access operation at 1201, it could not be an idle die, and could not have the priority token 00. Furthermore, if the die were also determined to not have the particular priority token 11 at 1205, and not have the first lesser priority token 10 at 1221, the die would necessarily have the second lesser priority token 01. As such, the determination that the die has the second lesser priority token might be inherent, and the process could proceed from point B to 1233. However, if additional priority tokens were utilized, e.g., using a three-digit priority token, actions taken in response to other, lesser, priority tokens could be addressed with additional processing at 1239.

At 1233, the die might determine if there is sufficient available current budget to initiate the next phase of the access operation for the die for a selected operating mode of the one or more operating modes of the die for the next phase of the access operation. In response to determining that there is sufficient available current budget to proceed, the die, at 1235, might broadcast the current demand information for a selected operating mode of that phase of its access operation, and its present priority token, e.g., the second lesser priority token. The die might further initiate the next phase of the access operation in the selected operating mode. The selected operating mode might be a normal operating mode regardless of whether a low-peak-current operating mode is available. Alternatively, the selected operating mode might be the normal operating mode in response to determining that there is sufficient available current budget to initiate the next phase in the normal operating mode, and might be the low-peak-current operating mode in response to determining that there is insufficient available current budget to initiate the next phase in the normal operating mode, but sufficient available current budget to initiate the next phase in the low-peak-current operating mode.

In response to determining that there is not sufficient available current budget to proceed in the selected operating mode at 1233, the die might proceed to 1237. At 1237, the die might broadcast the current demand information for a paused die, along with the second lesser priority token. The die might further delay initiating the next phase of its access operation. Unlike dies having the first lesser priority token, dies having the second lesser priority token might not consider the dies having the particular priority token to be in an idle state when determining whether sufficient available current budget is available.

The process of FIGS. 12A-12C might be repeated for each die of a multi-die package, in a sequence, while the dies are enabled, e.g., by their chip enable signal. For some embodiments, the process of FIGS. 12A-12C might be repeated for the enabled dies in response to at least one of the dies of the multi-die package indicating that it is busy, e.g., as indicated by their shared ready/busy control signal. For example, upon broadcasting current demand information, whether at 1203, 1209 or 1211 of FIG. 12A, at 1217, 1219, 1225 or 1229 of FIG. 12B, or at 1235 or 1237 of FIG. 12C, the process might determine whether the die was a last die of a sequence as discussed with reference to FIG. 10A. In response to determining that the die was not the last die of the sequence, a die pointer might be advanced, e.g., incremented for an incremental counter, decremented for a decremental counter, changed to the next digit pattern of a sequence of a plurality of digit patterns, etc., and the process of FIGS. 12A-12C might be applied to the next die of the sequence. In response to determining that the die was the last die of the sequence, the process might initialize, e.g., re-initialize, the die pointer and apply the process of FIGS. 12A-12C to the initial die of the sequence.

Figure 13:
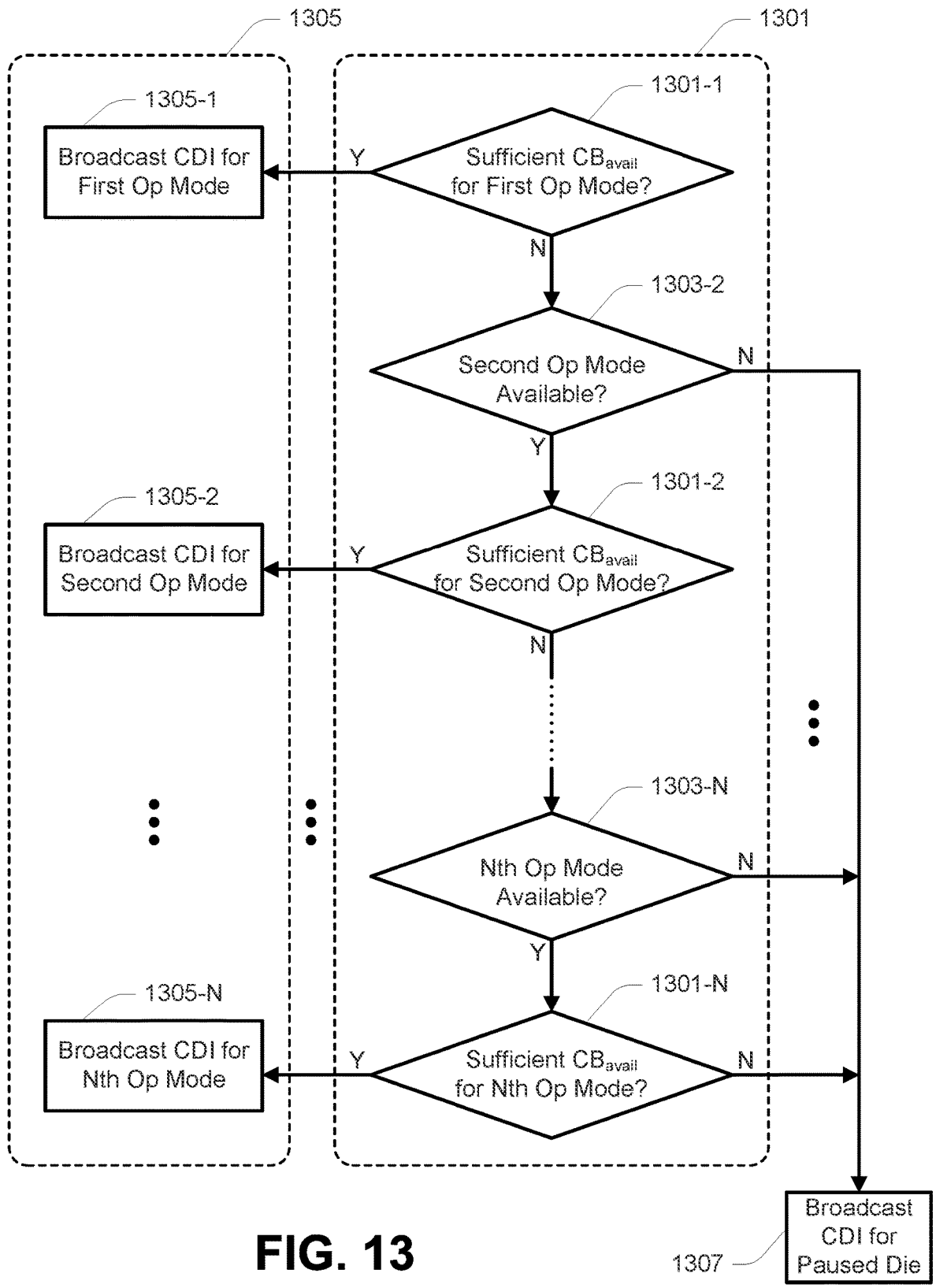
FIG. 13 is a flowchart of a portion of a method of operating a die in accordance with various embodiments.

FIG. 13 is a flowchart of a portion of a method of operating a die, e.g., a memory device or other integrated circuit device, in accordance with various embodiments. Various embodiments determined whether there was sufficient available current budget for one or two operating modes, e.g., a normal operating mode, or normal and low-peak-current operating modes. However, such embodiments could be modified if more than two operating modes are available. For example, at 1301, a die might determine whether there is sufficient available current budget to initiate a next phase of an access operation for the die in a selected operating mode for that phase of the access operation. In response to determining that there is sufficient available current budget to initiate the next phase of the access operation in the selected operating mode, the die might broadcast the current demand information for the die in the selected operating mode at 1305. In response to determining that there is insufficient available current budget to initiate the next phase of the access operation in the selected operating mode, the die might broadcast the current demand information for a paused die at 1307, and might further pause its operation, or continue to pause its operation, waiting for sufficient available current budget.

The selected operating mode might be a most preferred operating mode of the available operating modes for which there is sufficient budget. For example, for an access operation having N operating modes arranged in an order from a first operating mode, e.g., a normal operating mode, being deemed most preferred, to an Nth operating mode being deemed least preferred, the die might evaluate the expected peak current magnitudes of each of the N operating modes until it determines one having an expected peak current magnitude that maintains the total of the expected peak current magnitudes within (e.g., less than or equal to) the current budget. Note that the operating modes do not need to be arranged in an order of decreasing expected peak current demands.

As such, at 1301-1, the die might determine if there is sufficient available current budget to initiate the next phase of an access operation for the die in the first operating mode for that phase of the access operation. In response to determining that there is sufficient available current budget to proceed in the first operating mode, the die, at 1305-1, might broadcast the current demand information for the first operating mode of that phase of its access operation. The die might further initiate the next phase of the access operation in the first operating mode. In response to determining that there is not sufficient available current budget to proceed in the first operating mode, the die might proceed to 1303-2.

At 1303-2, the die might determine if a second operating mode is available to perform the next phase of the access operation. In response to determining that there is no second operating mode, the die might proceed to 1307 and broadcast the current demand information for a paused die, and might further pause its operation, or continue to pause its operation, waiting for sufficient available current budget. In response to determining that the second operating mode is available, the die might proceed to 1301-2.

At 1301-2, the die might determine if there is sufficient available current budget to initiate the next phase of an access operation for the die in the second operating mode for that phase of the access operation. In response to determining that there is sufficient available current budget to proceed in the second operating mode, the die, at 1305-2, might broadcast the current demand information for the second operating mode of that phase of its access operation. The die might further initiate the next phase of the access operation in the second operating mode. In response to determining that there is not sufficient available current budget to proceed in the second operating mode, the die might proceed to 1303-N.

At 1303-N, the die might determine if an Nth operating mode is available to perform the next phase of the access operation. In response to determining that there is no Nth operating mode, the die might proceed to 1307 and broadcast the current demand information for a paused die, and might further pause its operation, or continue to pause its operation, waiting for sufficient available current budget. In response to determining that the Nth operating mode is available, the die might proceed to 1301-N. Note that proceeding from 1301-2 to 1303-N might include determining whether one or more additional operating modes between the second operating mode and the Nth operating mode are available, and whether there is sufficient available current budget at each of those operating modes, including broadcasting the corresponding current demand information in response to determining that there is sufficient available current budget.

At 1301-N, the die might determine if there is sufficient available current budget to initiate the next phase of an access operation for the die in the Nth operating mode for that phase of the access operation. In response to determining that there is sufficient available current budget to proceed in the Nth operating mode, the die, at 1305-N, might broadcast the current demand information for the Nth operating mode of that phase of its access operation. The die might further initiate the next phase of the access operation in the Nth operating mode. In response to determining that there is not sufficient available current budget to proceed in the Nth operating mode, the die might proceed to 1307 and broadcast the current demand information for a paused die, and might further pause its operation, or continue to pause its operation, waiting for sufficient available current budget.

CONCLUSION

Although specific embodiments have been illustrated and described herein, it will be appreciated by those of ordinary skill in the art that any arrangement that is calculated to achieve the same purpose might be substituted for the specific embodiments shown. Many adaptations of the embodiments will be apparent to those of ordinary skill in the art. Accordingly, this application is intended to cover any adaptations or variations of the embodiments.

What is claimed is:

1. A memory device, comprising:
   an array of memory cells;
   a node for connection to a signal line;
   a plurality of registers, wherein one register of the plurality of registers is configured to store an expected peak current magnitude of the memory device and a priority token of the memory device, and wherein remaining registers of the plurality of registers are each configured to store a respective expected peak current magnitude of a respective different memory device; and
   a controller for access of the array of memory cells, wherein the controller is configured to cause the memory device to:
      determine whether the memory device is waiting to initiate a next phase of an access operation on the array of memory cells;
      in response to determining that the memory device is waiting to initiate the next phase of the access operation:
         determine whether there is sufficient available current budget to initiate the next phase of the access operation in a selected operating mode in response to at least:
            the priority token of the memory device;
            the respective expected peak current magnitudes of the remaining registers of the plurality of registers; and
            an expected peak current magnitude for the next phase of the access operation in the selected operating mode; and
         in response to determining that there is sufficient available current budget to initiate the next phase of the access operation in the selected operating mode, output the expected peak current magnitude for the next phase of the access operation in the selected operating mode to the node and store the expected peak current magnitude for the next phase of the access operation in the selected operating mode to the one register of the plurality of registers.

2. The memory device of claim 1, wherein the controller is further configured to cause the memory device to:
   determine whether the priority token of the memory device has a particular value of a plurality of values; and
   in response to determining that the priority token of the memory device has the particular value:
      in response to determining that there is sufficient available current budget to initiate the next phase of the access operation in the selected operating mode, change the priority token of the memory device to a different value of the plurality of values, and output the expected peak current magnitude for the next phase of the access operation in the selected operating mode and the priority token of the memory device having the different value to the node and store the expected peak current magnitude for the next phase of the access operation in the selected operating mode and the priority token of the memory device having the different value to the one register of the plurality of registers; and
      in response to determining that there is insufficient available current budget to initiate the next phase of the access operation in the selected operating mode, output an expected peak current magnitude for a normal operating mode and the priority token of the memory device having the particular value to the node.

3. The memory device of claim 2, wherein the remaining registers of the plurality of registers are each further configured to store a respective priority token of its respective different memory device, and wherein the controller is further configured to cause the memory device to:

determine whether there is sufficient available current budget to initiate the next phase of the access operation in the selected operating mode in response to at least:
the priority token of the memory device;
the respective priority tokens of the remaining registers of the plurality of registers;
the respective expected peak current magnitudes of the remaining registers of the plurality of registers; and
the expected peak current magnitude for the next phase of the access operation in the selected operating mode; and
in response to determining that the priority token of the memory device does not have the particular value:
determine whether any priority token of the plurality of registers has the particular value; and
in response to determining that the respective priority token of at least one register of the plurality of registers has the particular value:
determine whether the priority token of the memory device has the different value;
in response to determining that the priority token of the memory device has the different value:
determine whether there is sufficient available current budget to initiate the next phase of the access operation in the selected operating mode;
in response to determining that there is sufficient available current budget to initiate the next phase of the access operation in the selected operating mode, output the expected peak current magnitude for the selected operating mode and the priority token having the different value to the node; and
in response to determining that there is insufficient available current budget to initiate the next phase of the access operation in the selected operating mode:
determine whether there is sufficient available current budget to initiate the next phase of the access operation in the selected operating mode if the respective expected peak current magnitude of each register of the plurality of registers having the particular value for its respective priority token is deemed to be the expected peak current magnitude of an idle memory device;
in response to determining that there is sufficient available current budget to initiate the next phase of the access operation in the selected operating mode if the respective expected peak current magnitude of each register of the plurality of registers having the particular value for its respective priority token is deemed to be the expected peak current magnitude of an idle memory device, output the expected peak current magnitude for the selected operating mode and the priority token having the different value to the node; and
in response to determining that there is insufficient available current budget to initiate the next phase of the access operation in the selected operating mode if the respective expected peak current magnitude of each register of the plurality of registers having the particular value for its respective priority token is deemed to be the expected peak current magnitude of an idle memory device, output the expected peak current magnitude for an idle memory device and lesser priority token having the different value to the node.

4. The memory device of claim 3, wherein the controller is further configured to cause the memory device to:
in response to determining that the priority token of the memory device does not have the different value:
determine whether there is sufficient available current budget to initiate the next phase of the access operation in the selected operating mode;
in response to determining that there is sufficient available current budget to initiate the next phase of the access operation in the selected operating mode, output the expected peak current magnitude for the selected operating mode and the priority token having a further value of the plurality of values to the node; and
in response to determining that there is insufficient available current budget to initiate the next phase of the access operation in the selected operating mode, output the expected peak current magnitude for an idle memory device and priority token having the further value to the node.

5. The memory device of claim 1, wherein the available current budget is equal to a total current budget available to the memory device and to the respective memory device for each of the remaining registers of the plurality of registers, minus a current budget reserve corresponding to priority token of the memory device.

6. The memory device of claim 5, wherein the priority token of the memory device is a particular priority token of a plurality of priority tokens assignable to the memory device, and wherein each priority token of the plurality of priority tokens corresponds to a respective current budget reserve of a plurality of current budget reserves.

7. The memory device of claim 6, wherein each priority token of the plurality of priority tokens corresponds to a respective priority level of a plurality of priority levels, wherein the respective current budget reserve for a priority token of the plurality of priority tokens corresponding to a highest priority level of the plurality of priority levels is less than the respective current budget reserve for each priority token of the plurality of priority tokens corresponding to a priority level of the plurality of priority levels lower than the highest priority level of the plurality of priority levels, and wherein the respective current budget reserve for a priority token of the plurality of priority tokens corresponding to a lowest priority level of the plurality of priority levels is greater than the respective current budget reserve for each priority token of the plurality of priority tokens corresponding to a priority level of the plurality of priority levels higher than the lowest priority level of the plurality of priority levels.

8. A memory device, comprising:
an array of memory cells; and
a controller for access of the array of memory cells, wherein the controller is configured to cause the memory device to:
determine whether the memory device is waiting to initiate a next phase of an access operation on the array of memory cells;
in response to determining that the memory device is waiting to initiate the next phase of the access operation:
determine a value of a current budget reserve corresponding to the memory device;

determine an available current budget to be equal to a total current budget available to a plurality of memory devices minus the current budget reserve corresponding to the memory device, wherein the plurality of memory devices includes the memory device and one or more other memory devices in communication with the memory device;

determine whether there is sufficient available current budget to initiate the next phase of the access operation in a selected operating mode;

in response to determining that there is sufficient available current budget to initiate the next phase of the access operation in the selected operating mode, broadcast an expected peak current magnitude for the selected operating mode to remaining memory devices of the plurality of memory devices; and in response to determining that there is insufficient available current budget to initiate the next phase of the access operation in the selected operating mode, broadcast an expected peak current magnitude for a paused memory device to the remaining memory devices of the plurality of memory devices.

9. The memory device of claim 8, wherein the controller being configured to cause the memory device to determine whether there is sufficient available current budget to initiate the next phase of the access operation in the selected operating mode comprises the controller being configured to cause the memory device to determine whether a sum of the expected peak current magnitudes of the remaining memory devices of the plurality of memory devices, and the expected peak current magnitude for the selected operating mode, is less than or equal to the available current budget.

10. The memory device of claim 8, wherein the next phase of the access operation is an initial phase of the access operation.

11. The memory device of claim 8, wherein the controller is further configured to cause the memory device to:
in response to determining that the memory device is not waiting to initiate the next phase of the access operation:
broadcast an expected peak current magnitude for a paused memory device to remaining memory devices of the plurality of memory devices.

12. The memory device of claim 8, wherein the selected operating mode is a normal operating mode for the next phase of the access operation.

13. The memory device of claim 12, wherein the selected operating mode is the normal operating mode for the next phase of the access operation in response to determining that there is sufficient available current budget to initiate the next phase in the normal operating mode, and is a low-peak-current operating mode for the next phase of the access operation in response to determining that there is insufficient available current budget to initiate the next phase in the normal operating mode, but sufficient available current budget to initiate the next phase in the low-peak-current operating mode.

14. The memory device of claim 8, wherein the selected operating mode is a most preferred operating mode for the next phase of the access operation for which there is sufficient available current budget to initiate the next phase in that operating mode.

15. The memory device of claim 8, wherein the controller being configured to cause the memory device to determine the value of the current budget reserve corresponding to the memory device comprises the controller being configured to cause the memory device to determine a value of a priority token corresponding to the memory device, and to determine a value of a current budget reserve corresponding to that priority token, wherein each priority token of a plurality of priority tokens assignable to the memory device corresponds to a respective value of a plurality of values of the current budget reserve.

16. The memory device of claim 15, wherein each priority token corresponds to a respective priority level of a plurality of priority levels, wherein a priority token of the plurality of priority tokens corresponding to a highest priority level of the plurality of priority levels corresponds to a lowest value of the plurality of values of the current budget reserve, and wherein a priority token of the plurality of priority tokens corresponding to a lowest priority level of the plurality of priority levels corresponds to a highest value of the plurality of values of the current budget reserve.

17. The memory device of claim 15, wherein the controller being configured to cause the memory device to broadcast the expected peak current magnitude for the selected operating mode to the remaining memory devices of the plurality of memory devices comprises the controller being configured to cause the memory device to broadcast the priority token and the expected peak current magnitude for the selected operating mode to the remaining memory devices of the plurality of memory devices.

18. The memory device of claim 8, wherein the controller is further configured to cause the memory device to store each expected peak current magnitude broadcast by any of the remaining memory devices of the plurality of memory devices.

19. The memory device of claim 18, wherein the controller being configured to cause the memory device to store each expected peak current magnitude broadcast by any of the remaining memory devices of the plurality of memory devices comprises the controller being configured to cause the memory device to overwrite any prior stored expected peak current magnitude for each memory device of the remaining memory devices of the plurality of memory devices broadcasting an updated expected peak current magnitude.

20. The memory device of claim 8, wherein the controller being configured to cause the memory device to determine whether the memory device is waiting to initiate the next phase of the access operation comprises the controller being configured to cause the memory device to determine whether the memory device is waiting to initiate the next phase of the access operation in response to a memory device pointer having a value corresponding to the memory device.

21. The memory device of claim 20, wherein each memory device of the plurality of memory devices corresponds to a respective value of a plurality of values of the memory device pointer.

22. The memory device of claim 21, wherein each value of the plurality of values of the memory device pointer is selected from a group consisting of a value of a counter and a digit pattern of a plurality of control signals.

23. A memory device, comprising:
an array of memory cells; and
a controller for access of the array of memory cells, wherein the controller is configured to cause the memory device to:
determine whether the memory device is waiting to initiate a next phase of an access operation on the array of memory cells;

in response to determining that the memory device is waiting to initiate the next phase of the access operation:
  determine whether the memory device has a particular priority token of a plurality of priority tokens;
  in response to determining that the memory device has the particular priority token:
    determine whether there is sufficient available current budget to initiate the next phase of the access operation in a selected operating mode, wherein the available current budget is equal to a total current budget available to a plurality of memory devices comprising the memory device;
    in response to determining that there is sufficient available current budget to initiate the next phase of the access operation in the selected operating mode, change its priority token to a lesser priority token of the plurality of priority tokens, and broadcast an expected peak current magnitude for the selected operating mode and the lesser priority token to remaining memory devices of the plurality of memory devices; and
    in response to determining that there is insufficient available current budget to initiate the next phase of the access operation in a normal operating mode, broadcast an expected peak current magnitude for the normal operating mode and the particular priority token to the remaining memory devices of the plurality of memory devices.

24. The memory device of claim 23, wherein the memory device is connected to a signal line, wherein the signal line is connected to each memory device of the plurality of memory devices, and wherein the controller is further configured to cause the memory device to:
  in response to determining that the memory device does not have the particular priority token:
    determine whether any memory device of the plurality of memory devices has the particular priority token;
    in response to determining that at least one memory device of the plurality of memory devices has the particular priority token:
      determine whether the memory device has the lesser priority token;
      in response to determining that the memory device has the lesser priority token:
        determine whether there is sufficient available current budget to initiate the next phase of the access operation in a selected operating mode;
        in response to determining that there is sufficient available current budget to initiate the next phase of the access operation in the selected operating mode, broadcast an expected peak current magnitude for the selected operating mode and the lesser priority token to remaining memory devices of the plurality of memory devices; and
        in response to determining that there is insufficient available current budget to initiate the next phase of the access operation in the selected operating mode:
          determine whether there is sufficient available current budget to initiate the next phase of the access operation in a selected operating mode if each memory device of the plurality of memory devices having the particular priority token is deemed to be idle;
          in response to determining that there is sufficient available current budget to initiate the next phase of the access operation in the selected operating mode if each memory device of the plurality of memory devices having the particular priority token is deemed to be idle, broadcast an expected peak current magnitude for the selected operating mode and the lesser priority token to remaining memory devices of the plurality of memory devices; and
          in response to determining that there is insufficient available current budget to initiate the next phase of the access operation in the selected operating mode if each memory device of the plurality of memory devices having the particular priority token is deemed to be idle, broadcast the expected peak current magnitude for an idle memory device and the lesser priority token to the remaining memory devices of the plurality of memory devices.

25. The memory device of claim 23, wherein the controller is further configured to cause the memory device to:
  in response to determining that no memory device of the plurality of memory devices has the particular priority token:
    determine whether there is sufficient available current budget to initiate the next phase of the access operation in a selected operating mode;
    in response to determining that there is sufficient available current budget to initiate the next phase of the access operation in the selected operating mode, broadcast an expected peak current magnitude for the selected operating mode and a priority token of the memory device to remaining memory devices of the plurality of memory devices; and
    in response to determining that there is insufficient available current budget to initiate the next phase of the access operation in the selected operating mode, broadcast the expected peak current magnitude for an idle memory device and the priority token of the memory device to the remaining memory devices of the plurality of memory devices.

26. The memory device of claim 23, wherein the lesser priority token is a first lesser priority token, and wherein the controller is further configured to cause the memory device to:
  in response to determining that the memory device does not have the first lesser priority token:
    determine whether there is sufficient available current budget to initiate the next phase of the access operation in a selected operating mode;
    in response to determining that there is sufficient available current budget to initiate the next phase of the access operation in the selected operating mode, broadcast an expected peak current magnitude for the selected operating mode and a second lesser priority token to remaining memory devices of the plurality of memory devices; and
    in response to determining that there is insufficient available current budget to initiate the next phase of the access operation in the selected operating mode, broadcast the expected peak current magnitude for an idle memory device and the second lesser priority token to the remaining memory devices of the plurality of memory devices.

27. The memory device of claim 23, wherein the controller being configured to cause the memory device to determine whether there is sufficient available current budget to initiate the next phase of the access operation in the selected operating mode comprises the controller being configured to cause the memory device to determine whether there is sufficient available current budget to initiate the next phase of the access operation in a plurality of different operating modes until it is determined that there is sufficient available current budget to initiate the next phase of the access operation in one of the operating modes of the plurality of different operating modes as the selected operating mode, or it is determined that there is insufficient available current budget to initiate the next phase of the access operation in any of the operating modes of the plurality of different operating modes.

* * * * *